United States Patent [19]

Matsuba et al.

[11] Patent Number: 5,153,923
[45] Date of Patent: Oct. 6, 1992

[54] HIGH ORDER INFORMATION PROCESSING METHOD BY MEANS OF A NEURAL NETWORK AND MINIMUM AND MAXIMUM SEARCHING METHOD THEREFOR

[75] Inventors: Ikuo Matsuba, Zama; Keiko Minami, Himeji, both of Japan

[73] Assignee: Hitachi, Ltd., Tokyo, Japan

[21] Appl. No.: 445,840

[22] PCT Filed: Mar. 24, 1989

[86] PCT No.: PCT/JP89/00317

§ 371 Date: Nov. 22, 1989

§ 102(e) Date: Nov. 22, 1989

[87] PCT Pub. No.: WO89/09457

PCT Pub. Date: Oct. 5, 1989

[30] Foreign Application Priority Data

Mar. 25, 1988 [JP] Japan ............................ 63-069420
Sep. 19, 1988 [JP] Japan ............................ 63-232377

[51] Int. Cl.$^5$ .............................................. G06K 9/00
[52] U.S. Cl. ........................................ 382/14; 382/15; 395/101
[58] Field of Search ................... 382/14, 15; 364/513

[56] References Cited

U.S. PATENT DOCUMENTS

| | | | |
|---|---|---|---|
| 4,805,225 | 2/1989 | Clark | 382/15 |
| 4,941,122 | 7/1990 | Weideman | 382/15 |
| 4,965,725 | 10/1990 | Rutenberg | 382/15 |
| 5,003,490 | 3/1991 | Castelaz et al. | 382/15 |

OTHER PUBLICATIONS

Koplowitz et al., "Motivation System for a Robot", *IEEE Trans. on Systems, Man and Cybernetics*, No. 4, Jul. 1973, pp. 425–428.

Mesrobian et al., "Discrimination of Natural Textures: . . . ," *IEEE 1st Int. Conf. on Neural Nets* Jun. 1987, pp. IV-247-258.

Fukushima et al. "Neocognitron: . . . ," *N. H. K. Laboratory Note*, No. 236, Sep. 1986, pp. 1, 3-13.

Carpenter et al., "The Art of Adaptive Pattern Recognition . . . ," *Computer*, vol. 21, No. 3, Mar. 1988 pp. 77-88.

*Primary Examiner*—Leo H. Boudreau
*Attorney, Agent, or Firm*—Antonelli, Terry, Stout & Kraus

[57] ABSTRACT

In order to improve the problematical points concerning the structure and the processing speed of a prior art neural network, the optimum structure of the neural network, in which a synapse structure constructed on the basis of living body physiological knowledge or presumed therefrom is determined to make it possible to realize high level information processing functions such as feature extraction, feature unification, memory, etc. Applications to an image recognition, a movement control, etc. making the most of the robust recognizing power thereof, or application to an optimum problem, a large scale numerical analysis, etc. making the most of the parallel processing power thereof are made possible.

17 Claims, 27 Drawing Sheets

FIG. 3(a-1)
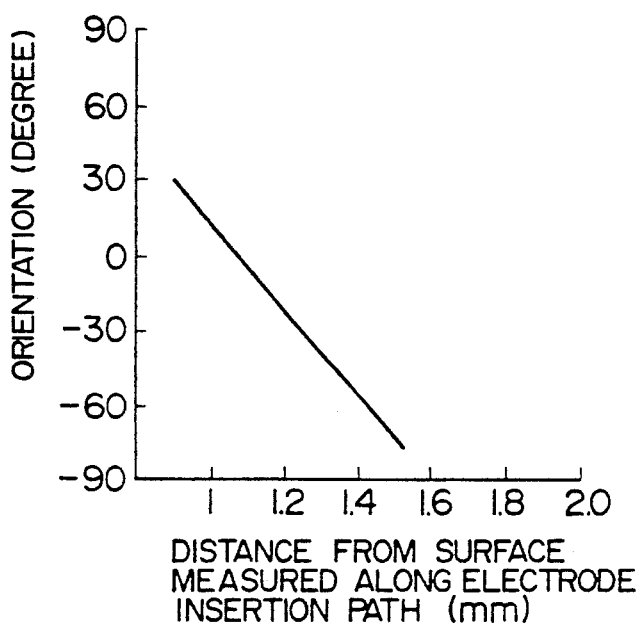
FIG. 3(a-2)
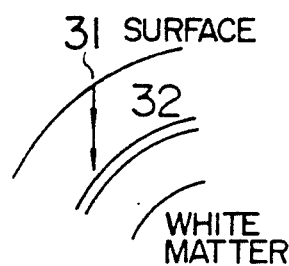
FIG. 3(b)
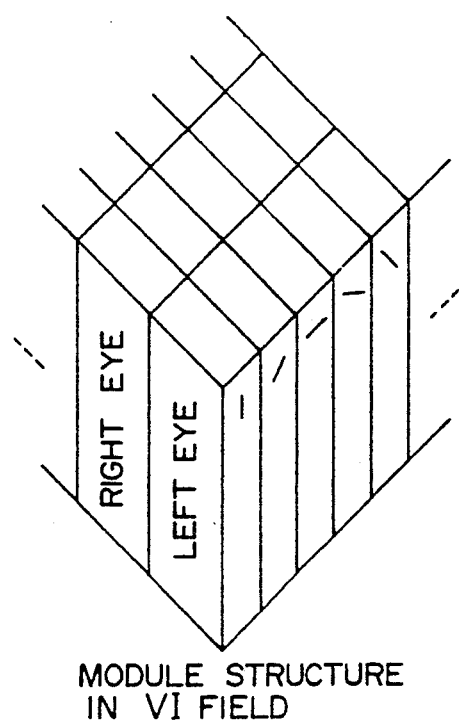
MODULE STRUCTURE IN VI FIELD (a)

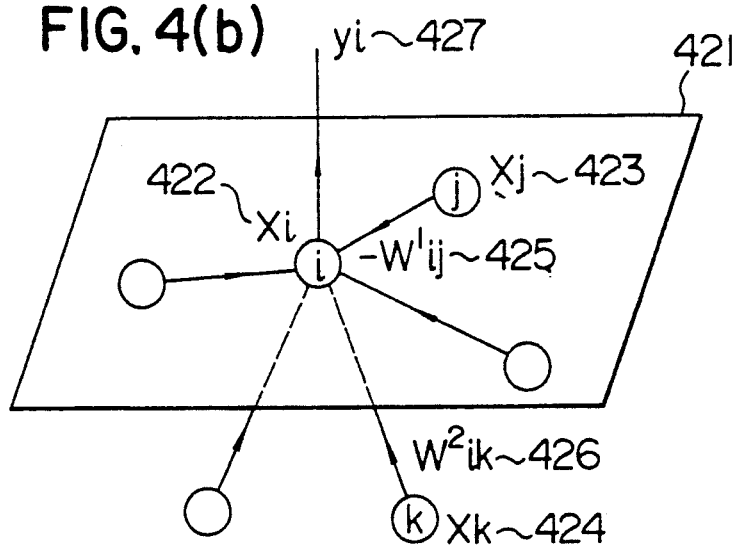
FIG. 4(b)
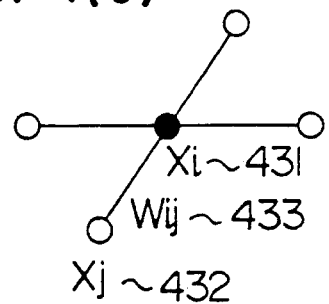
FIG. 4(c)
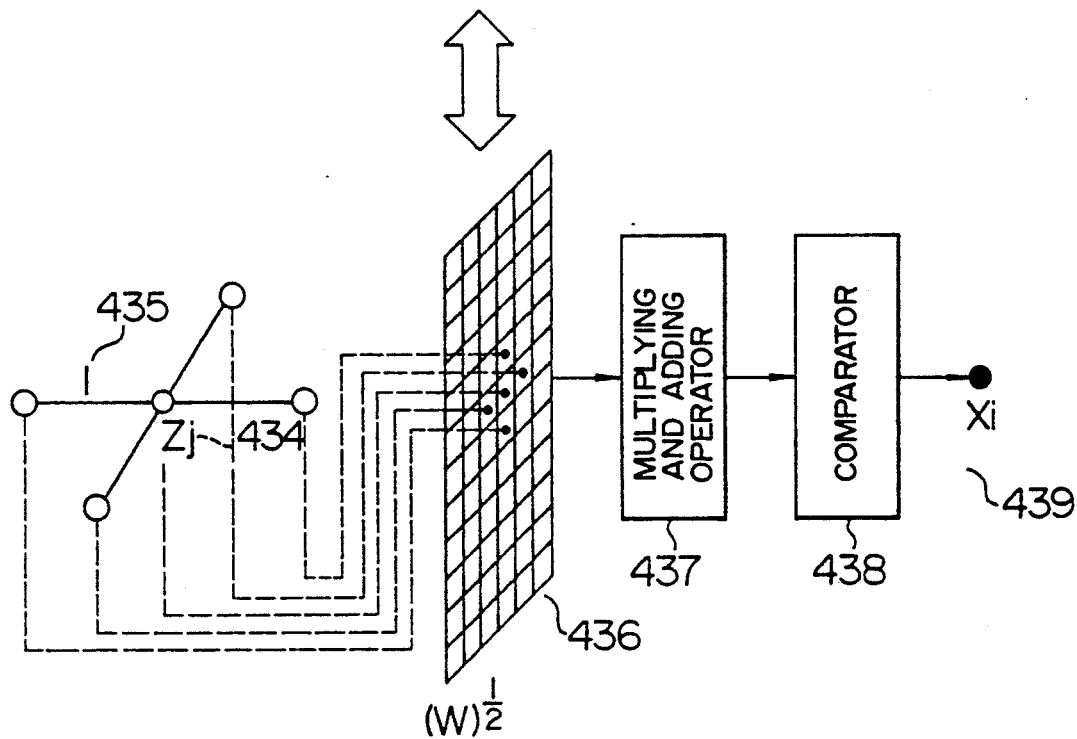

| NUMBER OF BRANCHINGS 541 | AMOUNT OF INFORMATION, WHICH CAN BE TRANSMITTED 542 |
|---|---|
| — | 1 |
| 1 | 0.5 |
| 2 | 0.25 |
| 3 | 0.125 |
| 4 | 0.0625 |
| 5 | 0.03125 |
| 6 | 0.015625 |
| 7 | 0.0078125 |

(e)

(a)

HIGH ORDER INFORMATION PROCESSING METHOD BY MEANS OF A NEURAL NETWORK AND MINIMUM AND MAXIMUM SEARCHING METHOD THEREFOR

TECHNICAL

The present invention relates to a method for constructing a neural network capable of solving problems such as recognition, which are difficult to solve by means of a conventional computer as well as the application thereof to pattern recognition, initial visual sensation processing, movement control, numerical analysis, etc.

BACKGROUND ART

Heretofore, learning, memorization, identification, etc. are discussed in "Parallel Distributed Processing I and II" by Mcclelland and Rumelhart (MIT Press, 1986). However neither knowledge on the cerebral physiology of living body, which is developed in the highest degree, is reflected therein nor discussion is done on the structure of the network, the speed of calculation, etc., which are problems, in the case where a practical application thereof is premised. In addition, no method for constructing the network for an object depending on the time is described therein.

On the other hand, a method for solving a neural network as an energy minimizing method is described in "Hop-field & Tank" (Science, Vol. 233 pp. 625-633 (1986)). However the neural network dealt with there is restricted to a monolayer and any solution cannot be obtained within a practical calculation time.

Hereinbelow a conventional technique by the minimum and maximum searching method for solving the neural network as an energy minimizing problem will be explained.

When the minimum (maximum) of a given cost function E was obtained, in the case where the cost function had a number of extreme values, generally it was difficult to obtain this minimum by the definite hill-climbing method as a conventional method. This is because, when a value in the neighborhood of a certain extreme value is given as an initial value, the system falls in a minimum value close thereto because of the fact that the method is definite and it is not possible to get out therefrom. Heretofore, in order to solve this problem, a definite hill-climbing method called simulated annealing has been proposed. Simply speaking, it is tried to reach the final destination by making it possible not only to climb the mountain but also to descend therefrom with a certain probability. By the method most widely utilized, taking a problem for obtaining the smallest value of E as an example, it can be solved as follows. At first, instead of considering directly the cost function E, it is considered to maximize a Bolzmann distribution $P = \exp(-E/T)$. The parameter T introduced therein is called temperature, which is introduced in order to generate random noise to make it possible to treat the problem statistically. Consequently, when the value obtained by calculation reaches a minimum value, it is necessary to set T at 0 and to make it stay at the minimum value without error. It is the greatest problem of the simulated annealing to determine the cooling schedule how to decrease T.

As discussed in IEEE Transaction on Pattern Analysis and Machine Intelligence, vol. 6, pp. 720-741, (1985), by the Geman brothers' schedule widely utilized heretofore, states are generated according to the Bolzmann distribution to fulfil $T(t) = T_0/\log(t+1)$, to being a positive constant. Here t corresponds to the number of Monte Carlo simulations and here it is defined that it represents the time. It is a matter of course that as t increases, T(t) approaches 0. Although several examples, in which this method can be successfully applied, have been already reported, there are many cases where it is not always successfully applied. Further, as discussed recently by Szu and Hartley in Physics Letters, vol. 123, pp. 157-161, (1987), in order to increase the convergence to the maximum of P, another schedule of $T(t) = T_0/t + 1$ has been proposed, which uses Lorenz distribution having a wider spread in stead of Bolzmann distribution. However a disadvantage common to these schedules is that no function form of the cost function, which is to be minimized, is taken into account at all. It is not reflected on T(t) what kind of cost barriers (difference in the cost between a minimum value and a maximum value in the neighborhood thereof) is to be climbed and when the final value is reached (when T is set at 0). Numerically it is proved that the desired greatest value of P is always reached by both the methods, when infinite time has lapsed. However, in practice, although there are cases where the smallest value is reached within a finite time, during which the simulation can be executed, since there are many cases where it is not, the value of utilizing them is not always high.

The disadvantage common to the schedules stated above is that the function form of the cost function, which is to be minimized, is not reflected on the temperature T. Therefore, in practice, the smallest value cannot be obtained often within a finite time, during which a simulation can be executed.

DISCLOSURE OF INVENTION

An object of the present invention is to provide a high order information processing method using a neural network capable of determining the optimum structure of the neural network, in which a synapse structure based on the physiological knowledge of the living body or inferred from the knowledge is taken-in, to realize a high degree information processing function such as feature extraction, feature unification, memorization, etc. and making possible applications to pattern recognition, movement control, etc. making efficient use of the robust recognizing power thereof as well as applications to optimization problem, large scale numerical analysis, etc. making efficient use of the parallel processing power thereof.

The problem for achieving the above object is to construct concretely a neural network effecting
1. feature extraction,
2. feature unification, and
3. memorization.

In the cerebrum the above processes are effected successively. As physiological knowledge the information processing system for the visual sensation on 1. and the plasticity of the synapse coupling on 3. are known only slightly. 2. is a presently active research field, but it has not yet been achieved to obtain any unified understanding. The high order information processing method by means of the neural network according to the present invention is an information processing method simulating a cerebrum. Concerning the process 1. a neural network is constructed on the basis of the physiological knowledge on the information processing system on the visual sensation and concerning the process 3. a memory circuit utilizing the plasticity of the synapse coupling is constructed. Although all the processes 1. to 3. are constructed by neural elements having a basically same function, they have different meanings representing the state of the neural elements. A concrete method for constructing them will be described in the item "Best Mode for Carrying Out the Invention".

Another object of the present invention is to provide a minimum and maximum searching method improving the problems of the conventional techniques described above. In order to achieve this object, the temperature T depends not only on the time but also on the function E, i.e. T=T(t,E). As a guiding principle for determining the dependence of the temperature T on E, it is required to minimize the time from the initial state to the state where the minimum value, which is the final target, is given. $t_1$ being the final point of time, E is determined so that this $t_1$ is minimum.

A maximization problem of a Bolzmann distribution exp (−E/T) in a one-dimensional space is taken as an example. The basic procedure by the simulated annealing is as follows (FIG. 11). At first the distribution is rewritten as exp (−E/T)=exp {−∫(E(x)/T)'dx}, where the mark ' represents a differential with respect to a spatial variable and ∫ - - - dx an integral. If T were a function of only t, this formula would be a simple equation. Now, denoting the difference in the cost between a certain state x (block 201) and the succeedingly generated state x' (block 202) by $\Delta E = E(x') - E(x) \approx E(x)'$ (block 203), the probability that the state passes to x' (block 204) is expressed by max [1, exp{−$\Delta(E/T)$}]. Whether the passage from the state x to the state x' is allowed or not is determined by comparing this value with a uniform random number $\eta$ from 0 to 1 (block 205). Consequently, if $\Delta E < 0$, the state passes necessarily to x' and if $\Delta E \geq 0$, i.e. even if the cost becomes higher, the passage is allowed with a probability determined by $\Delta E$ (blocks 206 and 207).

The dynamic process from a certain given initial state to the maximum value is defined by the following time development equation $$dx(t)/dt = -\Gamma H'(t,x) + \xi(x) \quad \text{(a)}$$

where it is defined that H(t,x)=E(x)/T(t,E) and it is supposed that the temperature depends on t and also on E or x. Further a positive parameter $\Gamma$ is a value of dispersion of an additive Gaussian noise $\xi(x)$, whose average value is 0. It is understood in a simple manner as follows that this dynamic equation gives a Bolzmann distribution exp{−H(t,x)} at least at a stationary state. Denoting the probability that the state has a value x at a certain point of time t by P(t,x), the probability differential equation for Eq. (a) is expressed by:

$$\partial P(t,x)/\partial t = \Gamma\{H'(t,x)P\}/\partial x + \Gamma \partial^2 P/\partial x^2 \quad \text{(b)}$$

The distribution $P_S$ at the stationary state is clearly proportional to exp(−H). Consequently the method for searching the maximum value utilizes the Bolzmann distribution at the neighborhood of the maximum value of P just as the simulated annealing. However, in the dynamic process thereto, a probability distribution, which is more efficient in some meaning, is used, as described below.

As a line for determining the aimed H(t,x), at first, it is required to effect the search with the shortest period of time. That is, $$\int_{t_0}^{t_1} d\tau = t_1 - t_0 \quad \text{(c)}$$

is minimized, where $t_0$ represents the initial point of time and $t_1$ the final point of time. Since $t_1$ is not known previously, it is here unknown. In order to minimize $t_1$, intuitively speaking, it is possible to achieve easily the neighborhood of the maximum value, if the temperature T is raised as highly as possible. However, what is a problem here is that fluctuations there increases proportionally to $\sqrt{T}$. That is, although it is easy to reach the neighborhood thereof, T should be decreased contrarily thereto in order to reach the true maximum. When this trade-off relation is expressed by the cost function J, which is to be minimized, it is suitable to use for example a function $$J = \int_{t_0}^{t_1} \{L/2T^2 + 1\}d\tau,$$

using a constant L. Since Eq. (a) includes not T but H, using given cost E and H, it can be expanded to;

$$J = <\int_{t_0}^{t_1} \{L/2(H'/E)^2 + 1\}d\tau> \quad \text{(d)}$$

where <————> means the average with the probability P(t,x). In the case where T doesn't depend to x, it is clearly equal to the cost described above.

Rearranging the problem, it is to determine a function H*, which is optimum for minimizing the cost expressed by Eq. (d) for the dynamic equation according to Eq. (a). The concrete procedure therefor will be described in the item "Best Mode for Carrying Out the Invention".

BRIEF DESCRIPTION OF DRAWINGS

FIGS. 3a-1—3g are schemes showing a network for the feature extraction;

BEST MODE FOR CARRYING OUT THE INVENTION

At first the principle of the neural network based on the present invention.

Figure 3C:
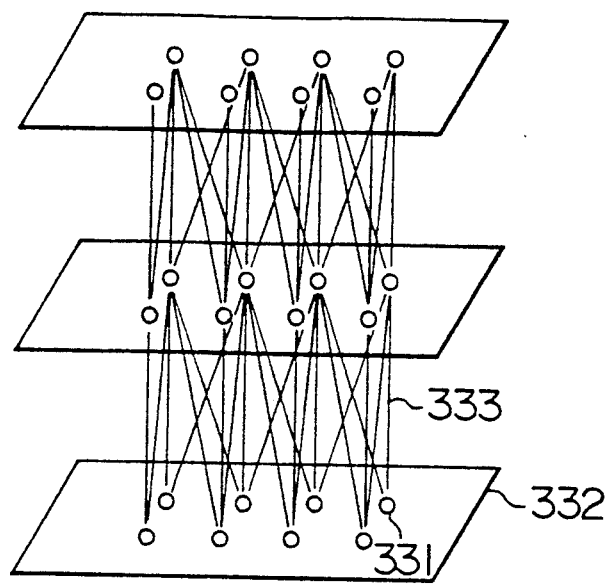

A neural network for the feature extraction is a network hierarchically constructed, as indicated in FIG. 3(c). It is supposed that neural elements 331 are arranged two-dimensionally on each of layers 332 and that there exist couplings 333 between different neural elements only between two layers adjacent to each other.

When a concrete circuit construction is determined, physiological knowledge is referred to. What is well known up to present is the MT field concerning the visual sensation field and the movement. Here a report entitled "Receptive fields, binocular interaction and functional architecture in the cat's visual cortex" (J. Physiol, London, Vol. 160, pp. 106-154, 1962) by Hubel and Wiesel, which relates to the extraction of the feature of the former.

FIG. 3(a) shows an experimental result indicating the orientation selectivity in the visual sensation region (the NL field) of the cerebral cortex. When an electrode 32 is inserted obliquely in a cerebrum from the surface 31, it is known that a group of cells reacting at a special value (with a 10° interval in the experiment) of the inclination of a light slit traversing the recepting field of the retina form a layer. In the direction perpendicular to the surface cells linked with each of the left and the right eye are concentrated. Therefore it can be seen that the cells are arranged in a module structure (FIG. 3(b)). Except that information from the left eye and that from the right eye appear alternately, the primitive features are extracted hierarchically in the visual sensation field by this module structure. For example, to each of the sides of a figure one layer corresponding thereto reacts to extract it. Further, although the layers have no inhomogeneity and are constructed by a completely same kind of neural elements, as information is transmitted, they extract sequentially different information as the result of the self organization.

Now, if this procedure is expressed mathematically, it can be written as follows;

$$F(l) = S[K_l(q, q_l) G(q)] \quad (1)$$

where l represents the number of the layer in the network; G(q) input information (figure) having a Fourier wave number q, which is rotationally symmetric with respect to the orientation of the optical slit or corresponding to that orientation; $K_l(q, q_l)$ is a kernel function extracting an orientation $q_l$ in a layer l; S a mathematical operation executed in the network; and F(l) a function, which is 0 except for the extracted layer. $q_l$ (l=1, 2, ---) gives angles with an interval of 10° in the example described above.

Figure 3D:
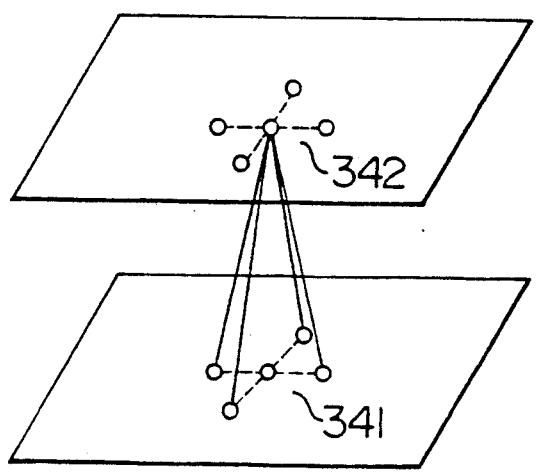

On the basis of the physiological knowledge as described above, an artificial neural network, which can realize the function expressed by Eq. (1), will be constructed. An example of the coupling structure between neural elements is indicated in FIG. 3(d). The state of elements in a layer of higher rank is determined as a function representing the state of 4 neural elements adjacent to each other in a layer of lower rank. In the following, a concrete method for determining the state of elements. Now the state of elements at a two-dimensional position r=(x,y) on a layer l is represented by $f_l(r)$. Then the coupling between elements on layers adjacent to each other is represented by a following state equation;

$$f_l(r) = F_l(\{f_{l-1}\}) + \xi_l, \ (l = 2, 3, \dots) \quad (2)$$

where $\{f_{l-1}\}$ represents the elements on the layer l−1 all together; $\xi_l$ added noise; and $F_l$ a general function for expressing the coupling between elements. It is supposed that $f_l(r)$ is given for the input layer (l=1). In a prior art neural network a non-linear saturation function such as a sigmoid function is given as the function $F_l$. However, in the information processing in the cerebrum, as a result of concurrent and competitive operation of a number of elements, universal processing independent of microscopic element functions should be executed. Therefore, in this step, no special functional form is presumed for $F_l$.

Eq. (2) can be rearranged as follows;

$$f_l(r) - f_{l-1}(r) = \frac{1}{T_{l-1}} \frac{\delta H(\{f_{l-1}\})}{\delta f_{l-1}} + \xi_l \quad (3)$$

where $H(\{f_{l-1}\})$ is a function determined, when $F_l$ is given; and $T_{l-1}$ is a positive constant. Further $\delta/\delta f_{l-1}$ represents a functional differentiation with respect to $f_{l-1}$. Although, as it can be seen later, the function H represents the energy of a system on the analogy of a physical system, H doesn't exist always, when $F_l$ is given. In the following, the formulation is executed, supposing that Eq. (3) is given Eq. (3) is a difference equation with respect to the number of layer l, from which a so-called Fokker-Plank type probability differential equation can be deduced, in the ease where l is great. If $P_l(f_l(r))$ represents the probability that the state of elements at a position r on a layer l is $f_l(r)$, the following equation is valid;

$$P_l(f_l(r)) - P_{l-1}(f_{l-1}(r)) = \frac{1}{T_{l-1}} \frac{\delta}{\delta f_l(r)} \quad (4)$$

$$\{\int\int \frac{\delta H(\{f_{l-1}\})}{\delta f_{l-1}(r')} P_l(f_{l-1}(r'))dr' + D \frac{\delta^2}{\delta f_{l-1}(r)\delta f_{l-1}(r)} P_l(f_{l-1}(r))$$

where D represents a dispersion of the added Gauss type noise ξ, but hereinbelow, for the sake of simplicity, it is put at 1.

The stational solution $P_l^s$ of Eq (4), in the case where l is sufficiently great, can be given by;

$$P_l^s \sim \exp(-H(\{f_{l-1}\})/T_{l-1}) \quad (5)$$

That is, when inputted information (signal) has passed through a sufficiently great number of layers, the distribution thereof approaches that described by Eq. (5). The distribution expressed by the above equation is called Bolzmann or Gibbs distribution, in which H corresponds to the energy of the system and T to the temperature.

Now, using the probability distribution expressed by Eq. (5), the relationship in the state of elements between different layers expressed by Eq. (2) is defined as follows;

$$\exp(-H(\{f_l\})/T_l) = F \exp(-H(\{f_{l-1}\})/T_{l-1}) \quad (6)$$

where F is an operator defined below and executed by the neural network. The basic operation burdened by the operator F is coarse-grained roughening in a feature extracting circuit 21. That is, the average value of the state of elements located in lower layers is propagated to upper layers.

$$\sum_{r'} f_{l-1}(r-r') \rightarrow f_l(r) \quad (7)$$

Figure 3E:
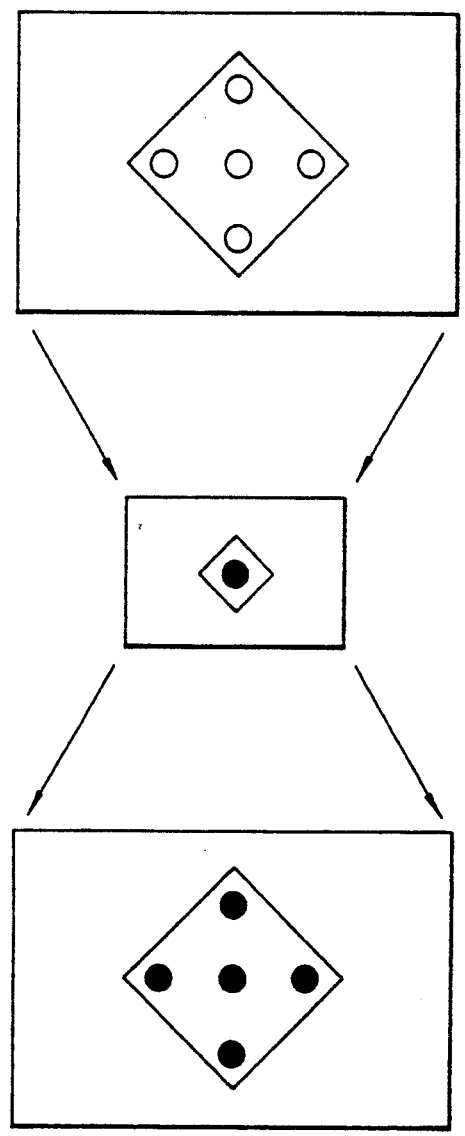

The summation in the left member is executed over the elements existing around the position r. Owing to thus visualization roughening, local fluctuations in $f_{l-1}$ become smaller. However, F should be defined so that the feature buried in $H(\{f_{l-1}\})$ is not lost. The intuitive interpretation of the transformation formula (6) of the probability distribution is to demand that the probability distribution consisting of feature components doesn't vary, even if noise components are eliminated. Since the layer space is reduced once by the visualization roughening (FIG. 3(e)), the action of returning the size to the initial one should be also included in F.

The procedure described above is a process called rememorization group transformation. It is more convenient to express the relationship by using the frequency region g than Eq. (6).

$$\exp(-H(\{f_l\})/T_l) = \int \ldots$$
$$\int \exp(-H(\{f_{l-1}\})/T_{l-1}) \Pi df_l f_{l-1}(q) \rightarrow \lambda \pi f_l(2q) \quad (8)$$

where $f_l$ is a value obtained by Fourier-Transforming $f_l(r)$ and 2q represents a transformation of enlargement by a factor of 2 in the frequency space, because the summation in Eq. (7) is executed only in the closest neighborhood. Further $\lambda_{l-1}$ is a constant and by the operation $f_{l-1}(q) \rightarrow \lambda_{l-1} f(2q)$ no noise components are mixed. If a concrete energy H is given, the operator F satisfying the demand described above, i.e. the relationship among the constant $\lambda_{l-1}$, $T_l$ and $T_{l-1}$, can be defined.

The energy $H(\{f_l\})$ represents the coupling relation among elements in the layer l. In general, H can be written as follows;

$$H = \Omega_1 \int \int (\nabla f_{l-1})^2 dr + \Omega_2 \int \int (\nabla^2 f_{l-1})^2 dr + \ldots + r \int \int f_{l-1}^2 dr + u \int \int f_{l-1}^4 dr + \ldots \quad (9)$$

where $\Omega_1$, $\Omega_2$, r and u are constants. Now, if the state of elements is expressed by $+1$ (ignition) and $-1$ (pause), since it can be thought that H is invariant with respect to the inversion of all the states of elements $\{f_l\} \rightarrow -\{f_l\}$, H contains only therms of (even number)-th order of $\{f_l\}$. That is, this is because the definition by $\pm 1$ is made only for the sake of convenience. The first term of Eq. (9) represents the coupling relation among the closest elements. It represents the most important local features of the coupling among elements in term of the energy. Consequently, it is desired that this term is unchanged for all the layers.

According to the demand described above, substituting the Fourier transformation of Eq. (9) for H in Eq. (8), executing the transformation of the right member, $$\lambda_{l-1} = 4/\sqrt{T_l/T_{l-1}} \quad (10)$$

can be obtained.

What is understood from Eq. (10) is that the temperature schedule expressed by $T_l = 4T_{l-1}$ is at a certain critical value. This is because, since at this time $\lambda_{l-1} = 1$, which corresponds to a simple averaging operation, as the signal propagates in the layers, the spatial distribution thereof becomes more and more uniform and finally only a signal having a uniform distribution can be obtained. This is an extreme smoothing processing, which means that all the information is lost. Therefore, introducing an extremely small quantity $\epsilon \equiv 4 - (T_l/T_{l-1})$, the non-linear terms in Eq. (a) are left. In this way, calculating Eq. (8), two equations expressing the relationship among the coefficients;

$$r_l = h_1(r_{l-1}, u_{l-1}, \ldots, T_{l-1})$$
$$u_l = h_2(r_{l-1}, u_{l-1}, \ldots, T_{l-1}) \quad (11)$$

are obtained, where $h_1$, $h_2$, --- are non-linear functions. The behavior of the solution of Eq. (11), when l is great, $r_l = O(\epsilon) < O$, $u_l = O(\epsilon) > O$, where $O(\epsilon)$ means a value of order of magnitude of $\epsilon$. All the terms such as $\Omega_2$, which don't appear in Eq. (11), are extremely small quantities of order of magnitude of $O(\epsilon^2)$, which can be neglected. In the result, when the temperature schedule of $T_l \approx 4T_{l-1}$ is supposed, for the layers, whose l is great, H approaches a universal energy given by;

$$H = \Omega_1 \int \int (\nabla f_{l-1})^2 dr + r_{l-1} \int \int f_{l-1}^2 dr + u_{l-1} \int \int f_{l-1}^4 dr \quad (12)$$

A concrete coefficient, in the case where l is great, is given by;

$$r_l = -\frac{\Lambda^2}{9} \epsilon, \quad u_l = \frac{\Lambda^4}{144 \cdot C} \frac{1}{T_l} \cdot \epsilon$$

where $\Lambda$ represents the maximum frequency ($= 2\pi/\nabla$, $\nabla$ being the spatial resolution) and C is a constant Since the temperature $T_l$ increases as $T_l \sim 4^l$, when l is great, $u_l$ is extremely small. Taking this into account, the energy given by Eq. (12) can be expressed, as follows, by using Fourier components $F_{l-1}(q)$;

$$H = \int \int [q^2 |F_{l-1}(q)|^2 + r_{l-1} |F_{l-1}(q)|^2] dq \quad (13)$$

Here, for the sake of simplicity, the procedure is normalized with $\Omega_1$. The essential feature extracting function is never changed.

From Eq. (5) representing the probability distribution and H given by Eq. (13) it can be understood that the component $F_{l-1}(\sqrt{-|r_{l-1}|})$ of the Fourier frequency, which is $q = \sqrt{1|r_{l-1}|}$ gives the maximum of the probability. That is, in the layers l−1 only the component $F_{l-1}(\sqrt{-|r_{l-1}|})$ is extracted. Now, when the initial value $r_1$ of $r_l$ is determined, based on the maximum frequency $\Lambda$, r approaches the value given by Eq. (13) in the order of;

$$r_1 < r_2 < r_3 \ldots < r_l \quad (14)$$

Figure 3F:
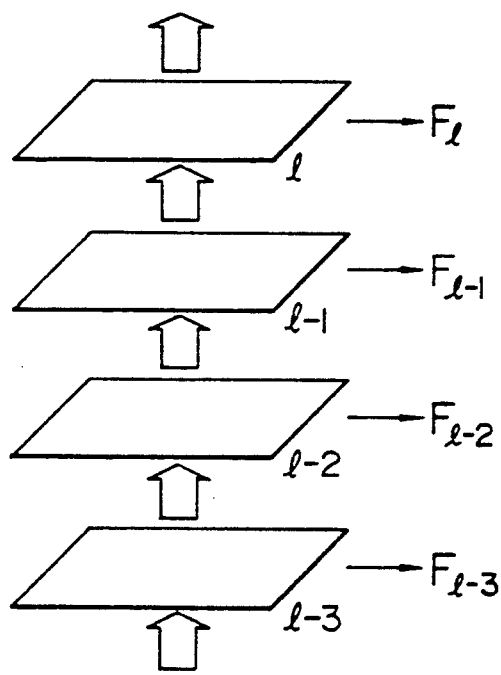

That is, it is possible to extract high frequency components in the lower layers (in the case where l is small)

and low frequency components in the upper layers (in the case where l is great) (FIG. 3(f)).

Figure 3G:
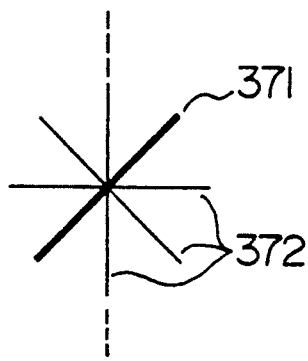

It is confirmed that the physiological experimental facts described previously can be simulated with the feature extracting network constructed as described above. The light slit is a viewed sensation object, which is symmetric with respect to a certain point. A copy 372 of the light slit 371, which copy has a given direction with respect to a certain direction (e.g. vertical direction), is prepared as indicated in FIG. 3(g). Then a group of slits including the slit can be defined unequivocally as a periodical function in the peripheral direction. The slit prepared in this way is inputted in the network stated above. If it is thought that the frequency q in Eq. (13) is the frequency in the peripheral direction, it is possible to take out successively specified frequencies.

2. Feature unifying network

Figure 4:
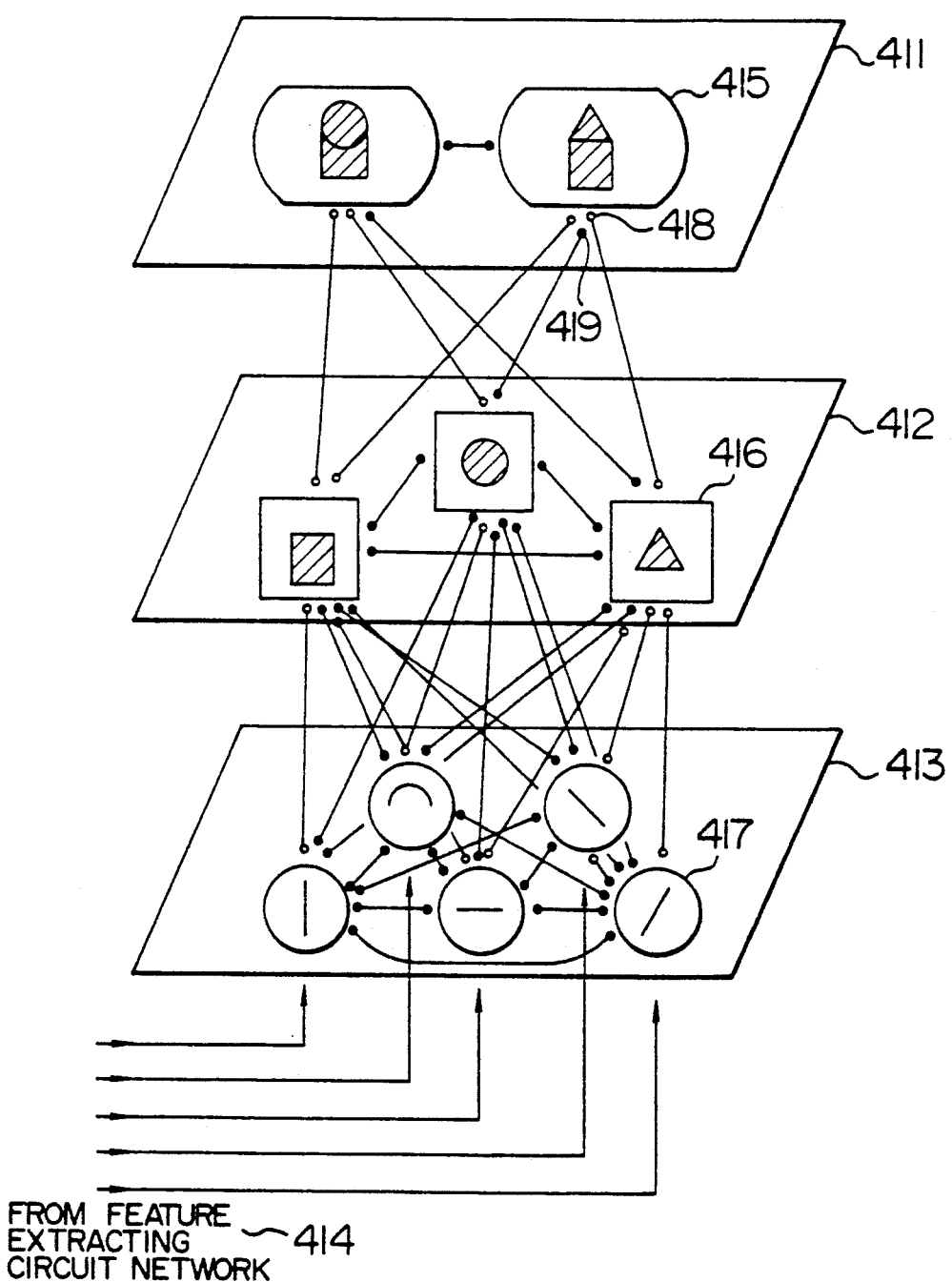
FIGS. 4a–4d are schemes showing a network for the feature unification.
Figure 4:
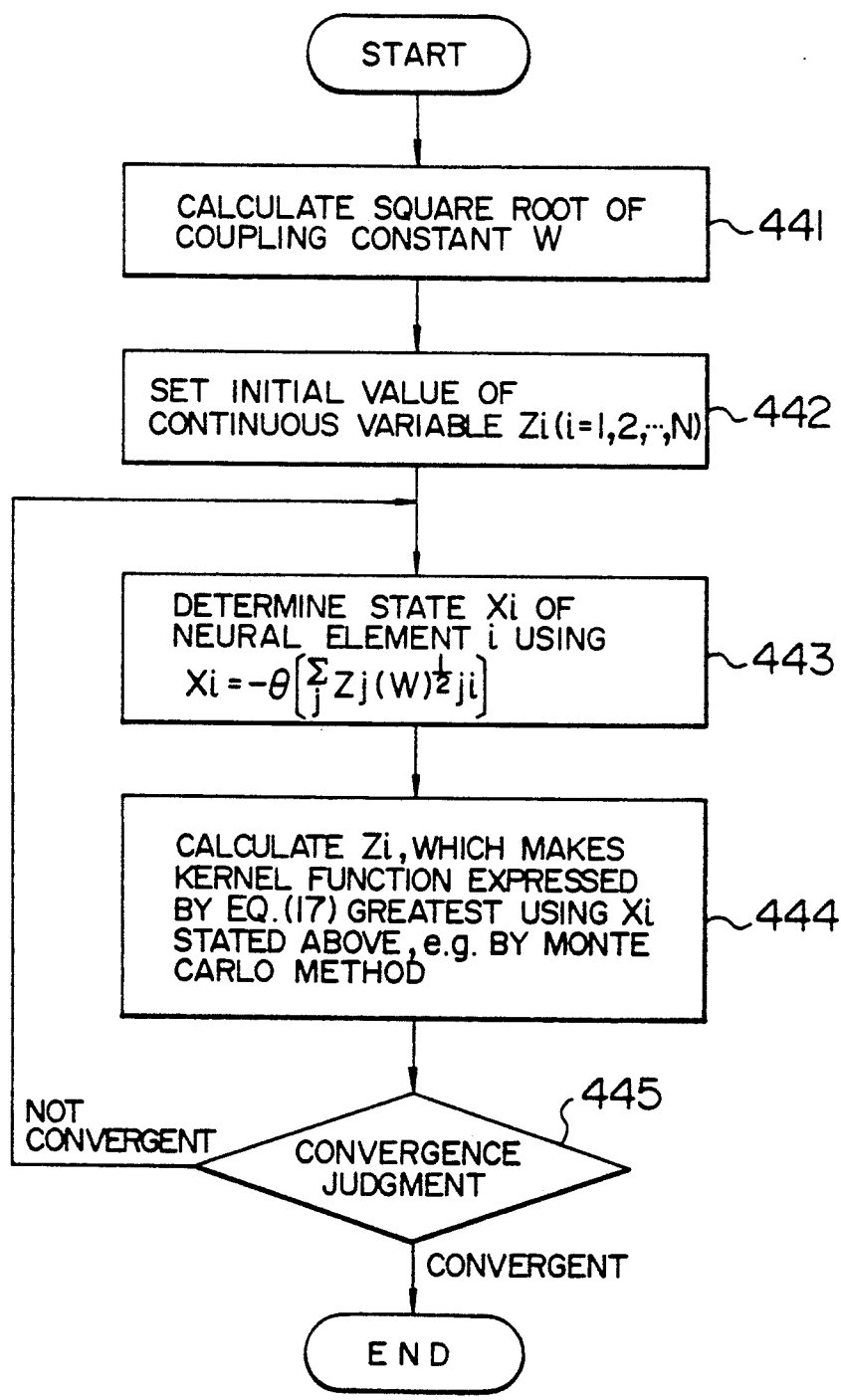

Primitive information extracted by the feature extracting network 414, e.g. the contour of a figure, etc., is inputted in a feature unifying network (FIG. 4(a)). FIG. 4(a) shows the process of unifying information by 3 layers as an example of the feature unifying network.

Each neural element 417 located in a first layer 413 bears respective primitive information. Since each group of information is exclusive, all the neural elements in the first layer are coupled with negative values with each other. That is, if an element corresponding to a certain group of primitive information is in the ignition state, the other elements should be in the pause state. Of course, in the case where a number of groups of primitive information are inputted simultaneously, since the corresponding elements are turned to the ignition state, no negative coupling is necessary among these elements. In general, the coupling is not always necessary among the elements in the first layer.

The neural elements 416 located in a second layer 412 are made to correspond to information constructed by the primitive information from the first layer, e.g. figures. Consequently they are joined with the elements in the first element corresponding to the sides constructing each of the figures with a positive value 418 and with the other elements with a negative value 419. Since each of the figures is exclusive, the elements in the second layer are coupled negatively.

The neural elements 415 located in a third layer 411 are made to correspond to information of higher order constructed by the information from the second layer, e.g. composite figures. Consequently they are joined positively with the elements in the second layer corresponding to a figure constructing each of the composite figures and negatively with the other elements.

The feature unifying process described above is not confirmed physiologically, but many alternative propositions are conceivable. For example, although a neural network consisting of 3 layers is used in this example, it may consist of 2 or 4 layers, depending on the object. Further the state represented by each of the neural elements may correspond to 1 group of information and also 1 group of information may be dispersed to a number of elements.

FIG. 4(b) is a conceptual scheme for calculating concretely the state of the neural elements in each of the layers. The state of a marked element i in a layer 421 is represented by $x_i$ 422. The variable $x_i$ ($i=1, 2, \cdots, N$) is either $+1$ (ignition state) or $-1$ (pause state). The input to the marked element is a sum of a signal from an element j 423 in the same layer and a signal from an element k 424 in another layer. Since the former has generally a negative effect, it has a coupling $-W_{ij}^1(<0)$ 425 and the latter has a coupling $W_{ik}^2$ 426, which can be either positive or negative. That is, the total input can be written as follows;

$$-\sum_j W_{ij}^1 x_i + \Sigma_k W_{ik} x_k \tag{15}$$

If the total input is greater than a certain threshold value, the element is ignited and otherwise it is in a pause state. Although it is possible to determine the state of each of the elements in each of the layers by this procedure, a little more elegant method will be described below. Forming a product of Eq. (15) and $x_i$, since this product is maximum in both the states, ignition and pause, it is sufficient to obtain the state, in which $$E(\{x\}) = -\sum_{ij} W_{ij} x_i x_j + \Sigma_i \theta x_i \tag{16}$$

is minimum, where $$W_{ij} = -W_{ij}^1 + W_{ij}^2,$$

$\theta$ being a threshold value.

The method, by which the state of elements is given in this way as the state, in which the energy function equation (16) is minimum, is disclosed in "Computing with neural circuits" by Hopfield & Tank (Science Vol. 233, pp. 625-633, 1986). However it doesn't deal with neural elements existing in a number of layers as in the present invention, but it takes only elements in a single layer into account. By this method, calculations are executed not successively from the lowest layer, as indicated previously, but the state of elements in all the layers can be calculated parallelly all together. Consequently the formulation according to Eq (16) is an algorithm suitable for parallel calculations.

It is in fact very difficult to obtain the minimum value of the energy represented by Eq. (16), because, since the state $x_i$ is two-valued, i.e. $\pm 1$, a number of minimum values appear and the true smallest value cannot be well obtained. On the basis of such a background Kirkpatrick, Gelatt and Vecchi have invented a simulated annealing method published in "Optimization by simulated annealing" (Science Vol. 220, pp. 671-680, 1983), which is a smallest value retrieving method by repeation utilizing the probability. The essential point of the present invention consists in that it is possible to escape from a minimum value owing to fluctuations given to the state by introducing a parameter, which is the temperature. Hopfield and tank have found further to be able to obtain a lower energy, if a problem of the discrete quantity of $x_1 = \pm 1$ is transformed into a problem of a continuous quantity $y_1(-\infty < y_i < \infty)$ through a transformation expressed by $x_i = \tan h$ ($y_i$/constant). A disadvantage of this method is that it takes a very long time. A minimum and maximum retrieving method improved from this point of view will be described later.

The minimization of the energy equation (16) is not restricted to the method as described above, but as an alternative method, e.g. the following method is known. By this method, since it is not necessary to introduce the tanh function for making the variable continuous, differing from the method described above, an excellent calculating property can be obtained. By the simulated annealing method, the maximization of the probability $\exp(-E/T)$ is taken into account instead of the minimization of the energy, where T is a positive parameter. This probability can be rewritten as follows, introducing a continuous variable $z_i (-\infty < z_i < \infty)$;

$$\exp(-E/T) \int_{i=1} \exp\left[ -\tfrac{1}{2}\Sigma z_i^2 + \sum_{i,j} z_i (W)_{ij}^{\frac{1}{2}} x_j \right] dz_i \tag{17}$$

This can be easily proved by using the following equation;

$$1 = (2\pi)^{-\frac{N}{2}} \int_i e^{-\frac{z_i^2}{2dz_i}}$$

Further, $(W)^{\frac{1}{2}}_{ij}$ means a (j, i) component of the square root of a matrix W. For the sake of simplicity it is supposed here that the threshold value $\theta$ is 0 and that the coupling constants $W_{ij}$ are symmetric with respect to the suffixes ($W_{ij} = W_{ji}$). The essential feature of the algorism is not lost by this supposition. When the kernel function of the integral of Eq. (17) is considered as a function of $x_i$, the smallest value thereof can be obtained clearly to $$x_i = -\theta\left[ \sum_j z_j (W)_{ji}^{\frac{1}{2}} \right].$$

Further, when the kernel function is a function of $z_i$, since it is a second order function convex downward, $$z_i = \sum_j (W)_{ij}^{\frac{1}{2}} x_j$$

gives the greatest value of the kernel function. Here $\theta$ is a stepwise function, which is 1, if the argument is positive, and $-1$, if the argument is negative. Consequently $$\begin{aligned} x_i &= -\theta\left[ \sum_j z_j (W)_{ji}^{\frac{1}{2}} \right] \\ &= -\theta\left[ \sum_j W_{ij} x_j \right] \end{aligned} \tag{18}$$

is valid and this expresses the basic function of the neural elements. That is, it is sufficient to execute the maximization of the kernel function given by Eq. (17) with respect to the continuous variable $z_i$.

FIG. 4(c) indicates the relation between the initial neural network, in which the neural element state $x_i$ 431 is coupled with an adjacent element $x_j$ 432 through $W_{ij}$ 433 and the network equivalent thereto, in which the continuous variable $z_i$ 434 represents the state of elements according to Eq. (17). All the coupling constants in the equivalent network are 1. The state of elements $x_i$ 439 is determined from the variable $z_i$ 434 calculated by using the equivalent network through a convolution operation 437 thereof with the square root $(W)^{\frac{1}{2}}$ of the coupling constant and a comparing operation 438.

The feature of the equivalent circuit thus constructed is that the calculation time (CPU time) is short, because it is not necessary to introduce newly the tanh function for making the function continuous, as Hopfield and Tank have done. Further, since the kernel function expressed by Eq. (17) is a second order function with respect to $z_i$, it is possible to preestimate an approximate value of the state $z_i$ giving the smallest value thereof, and in addition, since there exists no minimum values, it is possible to estimate the convergence from the initial state to the state, where the smallest value is given. In the minimization problem, since $x_i$ is two-valued, it was extremely difficult to determine the initial value, because numberless minimum values appeared, and in many case no suitable initial value was determined and no state of the smallest value could be obtained.

A concrete algorism for realizing the method described above is indicated in FIG. 4(d).

Algorithm

①  Start of the calculation.
②  The square root of the given coupling constant W is obtained. As an example, $x_{ij} = (W^{\frac{1}{2}})_{ij}$ is determined (block 441) by obtaining the solution of $$\sum_k x_{ik} x_{kj} = W_{ij}.$$

③  The initial value of the continuous variable $z_i$ (i = 1, 2, - - -, N) is set (block 442).
④  Based on $z_i$, the neural element state $x_i$ is determined from $$x_i = -\theta\left[ \sum_j z_j (W^{\frac{1}{2}})_{ji} \right]$$

(block 443). Here $\theta$ is a stepwise function, which is 1, if the argument is positive, and otherwise it is $-1$.
⑤  Based on $x_i$ determined in ④, $z_i$, which makes the kernel function expressed by Eq. (17) the greatest, is calculated e.g. by Monte Carlo method (block 444).
⑥  The convergence is judged. If it is not, ④ and ⑤ and are executed repeatedly. If it is, the process proceeds to the succeeding step (block 445).
⑦  Termination of the calculation.

3. Memory network

Figure 5A:
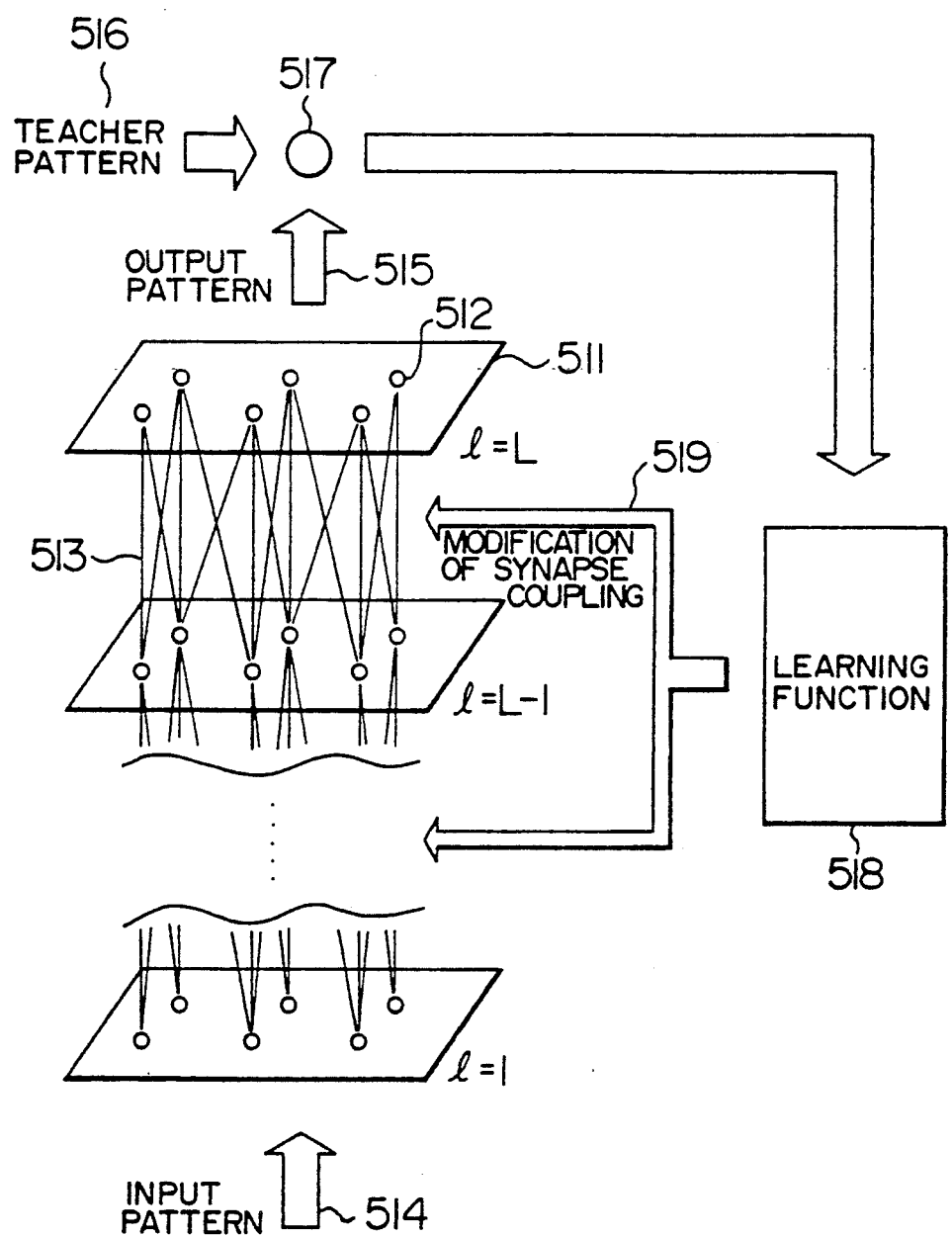
FIGS. 5a–5j are schemes showing a network for the memorization.

The high order information such as the figure unified by the feature unifying network is stored in a neural network, as indicated in FIG. 5(a). An input pattern 514 of the high order information is inputted in the lowest input layer and propagated to upper layers so that an output pattern 515 is outputted by the highest output layer. Neural elements 512 located in each of the layers 511 are located one- or two-dimensionally, corresponding to the input pattern. Further it is supposed that the state of each of the elements takes only 2 values, i.e. 1, if it is in the ignition state, and $-1$, if it is in the pause state. In the case where it is multi-valued, it can be dealt with by increasing the number of elements The principal function of the memory network is to store the relation between the in- and output patterns by learning 518. For example, into which class the input pattern is classified, as in the classification (output patterns constituting classes) is stored, or the relation between hand-written letters and correct letters corresponding thereto, as in the recognition of hand-written letters, is stored. Or it is also possible to control appropriately a control object, whose behavior is unknown, by learning.

Such a method for making a multi-layered neural network learn has been already developed in "Parallel Distributed Processing I and II" (MIT press, 1986). However, because of the following disadvantages, the use thereof in practice is limited to a small field.

(1) Synapse coupling structure

By the conventional method as disclosed in the publication stated above, from the point of view of dispersing the memory to all the synapse couplings, synapse couplings are spread over all the elements. Therefore the amount of information supported by each of the synapses is small so that even if incomplete information is given, complete information can be remembered as associated memory. However, since the time necessary for modifying the synapse couplings, depending on the learning, is proportional to the total number thereof, enormarous calculation time is necessary and therefore it is an undesirable structure in practice.

(2) Learning algorism

The conventional learning algorism disclosed in the publication stated above is a back-propagation method. By this method, at first, an appropriate initial value is set for the synapse coupling. Based on this initial synapse coupling, the state of elements is calculated from the lower layer to the upper layer one after another. In general, since the outputted value is different from a teacher pattern 516, the difference 517 therebetween is obtained. Then the synapse coupling is modified 519 so as to reduce the difference. The procedure described above is repeated, until the difference becomes 0. Such a method, by which the feedback function is the essence thereof, is intuitively understandable and the programming thereof is easy. But, on the other hand, the efficiency is not high from the point of view of the calculation time.

(3) Physiological knowledge on the memory

The memory described above, referring to the plasticity of the synapse coupling, corresponds physiologically to a long term memory. According to psychological experiments, it has been clarified that there exists a short term memory, for which no plasticity of the synapse is presumed, apart from the long term memory. A probability to obtain a memory method having a performance higher than the conventional one is hidden in simultaneous technological application of the two memory mechanisms.

On the basis of the background described above, the present invention gives a new method for the memory, which is a variation thereof. In the following the long term memory and the short term memory will be discussed separately.

3.1 Long term memory

In the neural network data or patterns are not stored, as they are, but they are dispersed to be stored in the network in the form of values of the synapse coupling. That is, they are coaded dispersedly. Now N data sets $I_i$ ($i=1, 2, \cdots, N$) are given as an input pattern. In general, the input pattern may be either one- or two-dimensional and either two-valued or multi-valued. In the case where they are multi-valued, since the input data $I_i$ can be transformed into two-valued data by increasing the number of data sets, hereinbelow it is supposed that $I_i$ is two-valued.

The process, by which the input pattern $I_i$ 514 propagates towards an upper layer, can be formulated, as follows. For the non-linear function F written in the form of $f = F(T_x)$, a sigmoid function having a threshold value, whose output f is $\pm 1$ in the saturated state, is representative. Denoting the output of the elements within the layer l by $f_i(l)$, a relational equation;

$$f_i(l) = F\left( \sum_j W_{ij}(l) f_j(l-1) \right) \quad (19)$$

is obtained, where $W_{ij}(l)$ indicates the value of the synapse coupling between the element i in the layer $(l-1)$ and the element j in the layer l. If $W_{ij}$ has some value for all the js, it represents that there exist couplings with all the elements in the layer $(l-1)$. The sum thereof over all the elements in the layer $(l-1)$ may be different from the number of the data sets N. When the relation given by Eq. (19) is applied successively from the input layer $(l-1)$ to the output layer $(l=L)$, $$f_i(L) = F\left\{ \sum_j W_{ij}(L) F\left( \sum_k W_{jk}(L-1) \ldots F\left( \sum_q W_{pq}(2) I_j \right) \ldots \right) \right\} \quad (20)$$

can be obtained.

Consequently memorization by learning is to determine the synapse coupling $W_{ij}(l)$ ($l=2, 3, \cdots, L$) so that the output $F_i(L)$ of Eq. (20) is equal to the teacher pattern $d_i$ 516. However Eq. (20) represents a system consisting of N equations (here it is supposed that there are also N outputs) and if all the elements are coupled with each other, there are $N^2(L-1)$ unknown coefficients $W_{ij}(l)$. That is, the unknown variables are excessively redundant. It can be thought that the amount of information per synapse has a magnitude of $N/N^2(L-1) = 1/N(L-1)$. If N or L is great, since each of the synapses supports only little information, flexible processing such as e.g. associated memory is possible. However, in a real cerebrum, since N is greater than 10 billions, the ratio stated above is substantially equal to 0. Further, in the cerebrum, all the neural elements are not coupled with each other by the synapse coupling. This suggests that there exists a kind of structure in the synapse coupling. Still further, when a uniform neural network is considered in the cerebrum, it is not conceivable that any object dependent type structure depending on the kind of given input is formed therein.

According to the present invention, the optimum structure of the synapse coupling is determined on the basis of the cerebral physiological knowledge. In the conventional neural network aiming technological applications, each of the synapse couplings is changed by learning, but information supported by each synapse is completely uniform in the average. That is, the dependence of $W_{ij}(l)$ on the suffixes i and j is not so great. For this reason, all the synapses should be modified, which makes it difficult to use it in practice from the point of view of the calculation time. At the present stage cerebral physiological experiments don't clarify so far the detailed structure of the synapse coupling. In the present situation rather only a kind of statistical, i.e. macroscopic structure is understood. However, since the macroscopic structure is determined by the structure of the synapse structure, it is possible to conjecture the microscopic synapse structure by the method described below.

Figure 5B:
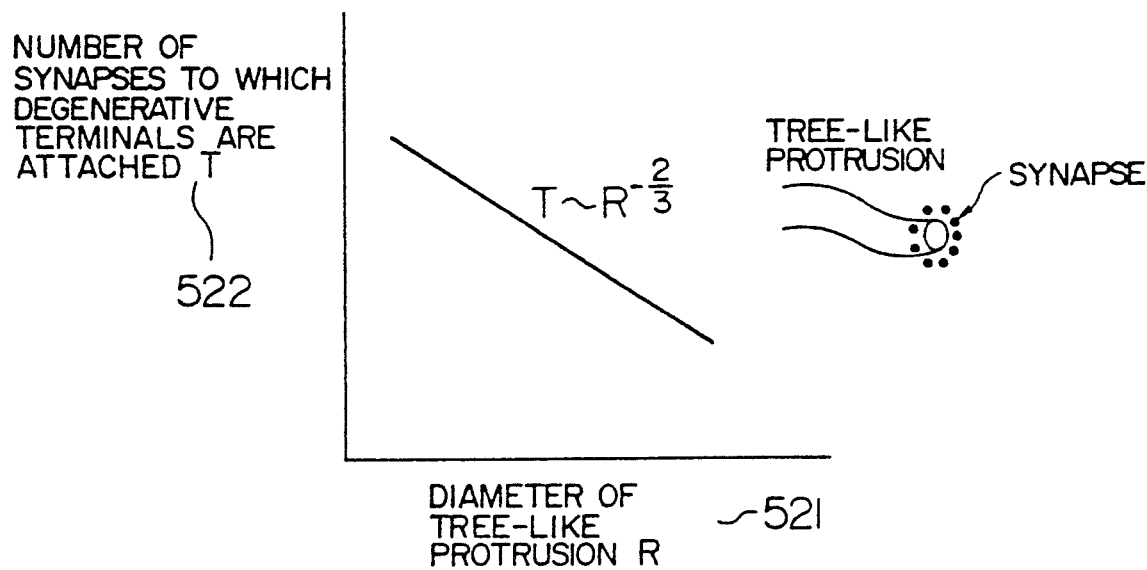
Figure 5B:
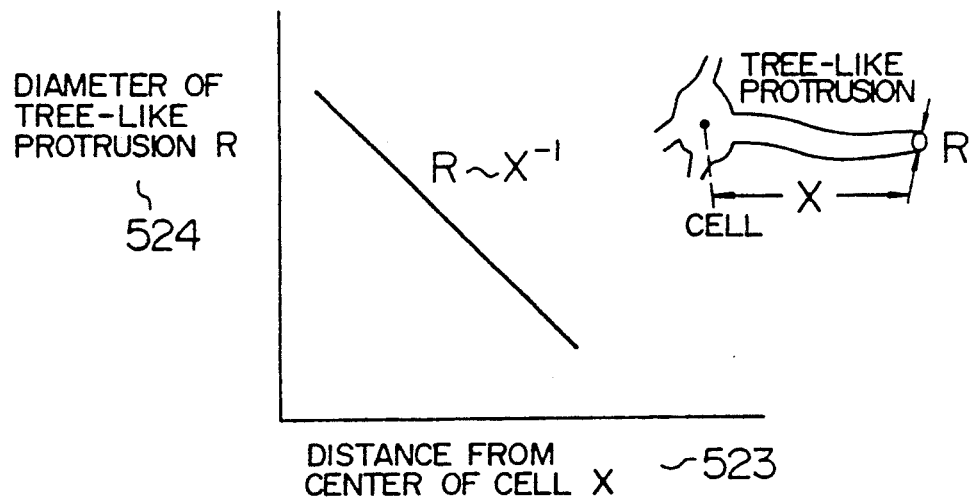

FIG. 5(b) indicates an example of the macroscopic structure obtained experimentally according to "A quantitative Study of Snaptic Reorganization in Red Nucleus Neurons after Lesion of the Nucleus Interpositus of the Cat" by Murakami et al (Brain Research, vol. 242, pp. 41–53, 1982). In the upper figure variations of the number of synapses T 522, to which degenerative terminals of cerebrum-red nucleus synapses are attached, are indicated in the function of the diameter R 524 of the tree-like protrusion and in the lower figure variations of the diameter R 524 of the tree-like protrusion are indicated in the function of the distance x 523 from the center of the cell having the tree-like protrusion.

In the upper figure a relation represented by $T \sim R^{-\alpha}$ ($\alpha = \frac{2}{3}$) and in the lower figure a relation represented by $R \sim x^{-\beta}$ ($\beta = 1$) are obtained, where the mark $\sim$ indicates a proportional relationship. The results described above relate to statistical quantities obtained by using a number of samples. It seems that the two figures are independent from each other at a glance. However, there exists an intimate relation therebetween as a conclusion from the structure of the synapse coupling. It is possible to infer the optimum structure of the synapse coupling by showing this fact.

Figure 5C:
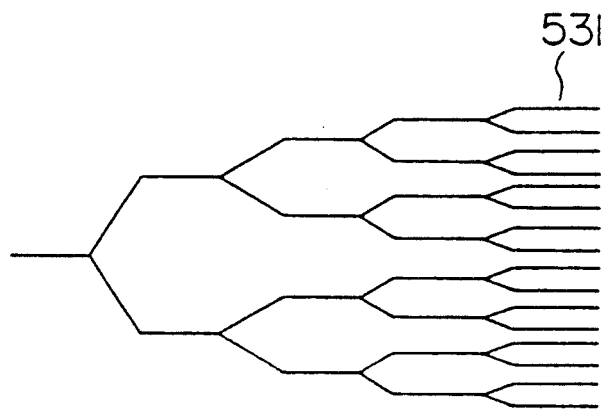
Figure 5C:
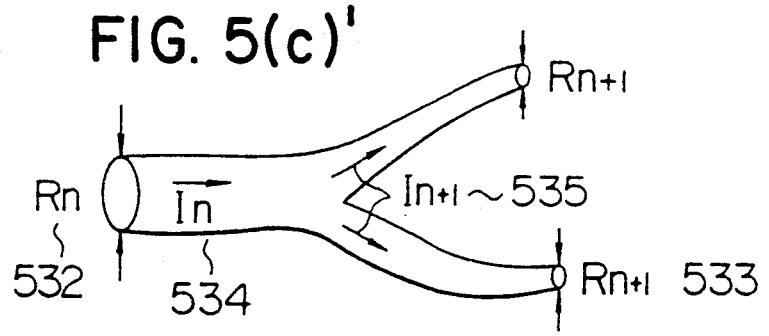
Figure 5C:
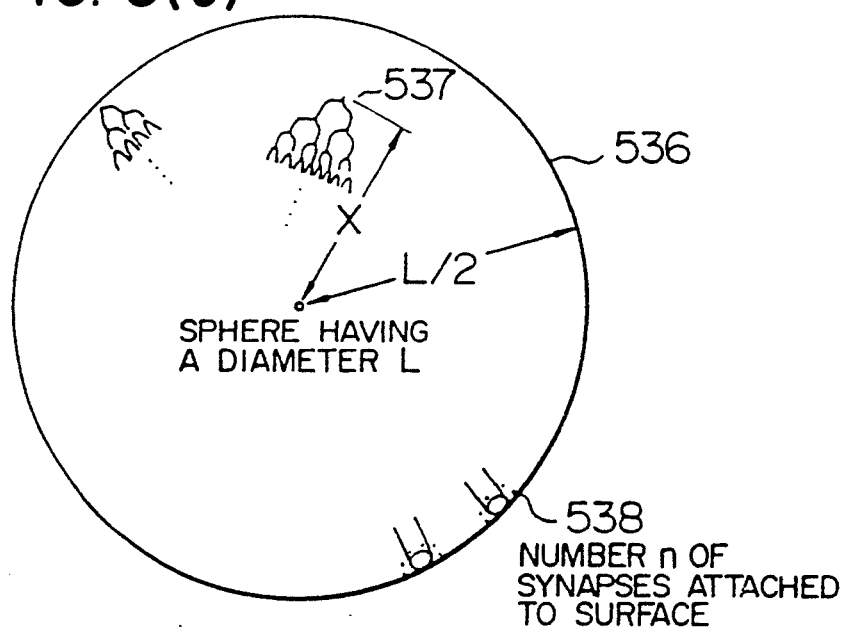

As indicated in FIG. 5(c), the branching of the tree-like protrusion is a bifurcation. By bifurcating n times, in total $2^n$ protrusions 531 are obtained. This branching is a branching method, which can be seen fairly generally. The signal propagating in the tree-like protrusion is a pulse train, which is a medium transmitting information. Consequently the information transmission efficiency should be different for every branch. For example, when the cross-section of the tree-like protrusion is approximated by a circle, the transmission efficiency depends on the diameter R.

Now the diameter of a branch generated by n bifurcations is represented by $R_n$ 532 and the diameter of a branch generated by the succeeding bifurcation by $R_{n+1}$ 533. Information sets flowing through these branches are represented by $I_n$ 534 and $I_{n+1}$ 535, respectively. Here the flow of information is replaced by a flow of electric current in an equivalent circuit. The energy consumed in this branch is considered here. The energy corresponding to electric power is clearly proportional to $I_n^2/R_n^2$, where the fact that the resistance is inversely proportional to the area of the cross-section of the protrusion $4\pi R_n^2$ is used. The volume occupied in the space by this branch is equal to $4\pi R_n^2 \times$(length of the branch) and it is conceivable that the living body regulates this volume so as to occupy a space as small as possible. Forming a summation of the energy stated previously and this volume over all the branches;

$$\sum_n \frac{I_n^2}{R_n^2} + \sum_n (4\pi R_n^2 \times \text{length}) \times \text{coefficient} \quad (21)$$

where the coefficient is a positive constant for fitting the dimension of the terms. The minimization of this quantity expresses mathematically that transmission of a same quantity of information is achieved by utilizing energy as little as possible and a space as small as possible. Now, supposing that the length and the coefficient are constant, it is understood that the formula (21) is minimized, in the case where a relation;

$$R_n^2 \sim I_n \quad (22)$$

is fulfilled, by putting the differential of the formula (21) with respect to $R_n$ at 0. Concerning the electric current flowing through the bifurcated branches, $I_n = 2 I_{n+1}$ is valid, and from the formula (22) together therewith $$\frac{R_{n+1}}{R_n} = \frac{1}{\sqrt{2}} \quad (23)$$

is obtained. That is, the diameter of the tree-like protrusion is reduced to $1/\sqrt{2}$ for every bifurcation.

Denoting the diameter of the initial tree-like protrusion going out from the cell by $R_0$, since $R_0/\sqrt{2^n} = R_n$, after n bifurcations $$2^n = (R_0/R_n) \frac{\log \sqrt{2}}{\log(1\sqrt{2})\sim} \times 2^\beta \quad (24)$$

branches appear, where x represents the length of all the branches and a relation $R_n \sim x^{-\beta}$ is used. The formula (24) is a formula representing the total number of branches at a distance x measured from the center of the cell.

Although the formula (21) represents a hypothesis concerning the microscopic structure of the synapse coupling, it will be shown below that a series of resulting formulas (22) to (24) deduced on the basis of this hypothesis can explain FIG. 5(b) indicating physiological experimental facts. A sphere having a diameter L, as indicated in FIG. 5(c), is considered. The total number Q of the tree-like protrusions, which find their way from a cell within this sphere to the surface thereof, is calculated. Supposing that the cells are distributed uniformly in this sphere, the total number of the tree-like protrusions finding their way to the surface of the sphere can be calculated, as follows, using the formula (24);

$$Q \sim \int^L x^{2\beta} x dx \sin\theta d\theta d\psi \sim L^{2\beta+2} \quad (25)$$

where $xdx \sin\theta d\theta d\psi$ represents an incremental volume element within the sphere and $\theta$ and $\psi$ independent angles in the polar coordinate system. The formula (25) indicates that the dependence of Q on the diameter L of the sphere is $L^{2\beta+2}$.

On the other hand, another formula is deduced for Q from another point of view. The total number of Q of the tree-like protrusions is related clearly to the diameter L of the sphere and the number T of the synapse couplings at the surface of the sphere. This relation is expressed generally by;

$$Q = f(L, T) \quad (26)$$

The T dependence is conceived for taking the experimental facts indicates in FIG. 5(b) into account. Now a sphere of smaller scale having a diameter $L' = b^{-1}L$ ($b > 1$) is considered instead of the sphere having the diameter L. Together with this transformation T and Q are transformed into values given by $T' = b^{k_1}T$ and $Q' = b^{k_2}Q$, respectively. Since both T and Q are values defined at the surface of the sphere, clearly $k_1 = 2$ and $k_2 = 2$. That is, when all the quantities are measured with the unit of the small scale L', the quantities T and Q expressed two-dimensionally increase proportionally to the increase in the surface area with respect to the initial scale L. Even if the measurement is effected by using the quantity obtained by such a transformation, the relational equation expressed by Eq. (26) remains unchanged. Consequently, the following equations are obtained;

$$Q' = f(L', T)$$

$$f(L, T) = b^{-k_2} f(b^{-1}L, b^{k_1}L) \tag{27}$$

Since the diameter L of the sphere is an arbitrary quantity, a function f(L, T) satisfying the equation stated above for all L should be obtained. The result is written as follows;

$$f(L, T) = L^{-k_2} \hat{f}(L^{k_1}T) \tag{28}$$

where is a function, which cannot be defined only by Eq. (27).

Now, from experiments, the number T of synapses depends on the distance x from the center of the cell as $T \sim R^{-2} \sim x^{2\beta}$. Using the formula (24), when the relational equation is rearranged by using the formula $Q \sim x^{2\beta}$, another relational formula $$Q \sim T^{\frac{2}{\alpha}}$$

is obtained. Although this has been obtained for one tree-like protrusion, it is supposed that it is similarly valid for an assembly of a number of tree-like protrusions. At this time the unknown function $\hat{f}$ in Eq. (28) shows a dependence expressed by $$\hat{f}(K^{k_1}T) \sim L^{k\frac{2}{\alpha}} T^{\frac{2}{\alpha}}.$$

Consequently, Eq. (28) is transformed into;

$$Q \sim L^{-k_2 + k_1 \frac{2}{\alpha}} T^{\frac{2}{\alpha}} \tag{29}$$

This is another formula expressing the total number Q of the tree-like protrusions. From the dependence of the formulas (25) and (29) on L, $$2\beta + 2 = -k_2 + \frac{2k_1}{\alpha} \tag{30}$$

can be obtained. Substituting $k_1 = k_2 = 2$ in this relational equation.

$$\frac{2}{\alpha} - \beta = 2 \tag{31}$$

is obtained. This relational equation is valid just for the experimental formulas $\alpha = \frac{2}{3}$ and $\beta = 1$, which shows that the microscopic structure of the synapse coupling previously presumed is correct. That is, the optimum structure of the synapse coupling is determined so as to minimize the function given by the formula (21).

Figure 5D:
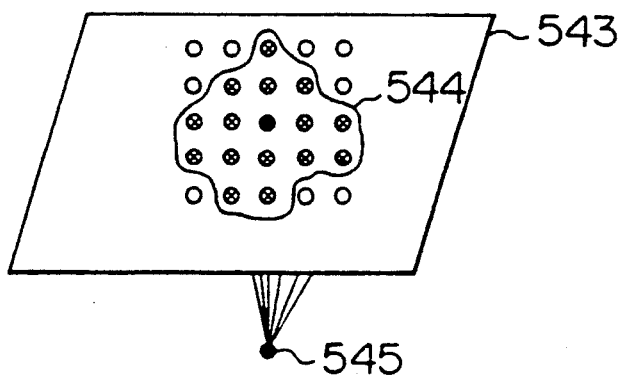
Figure 5:
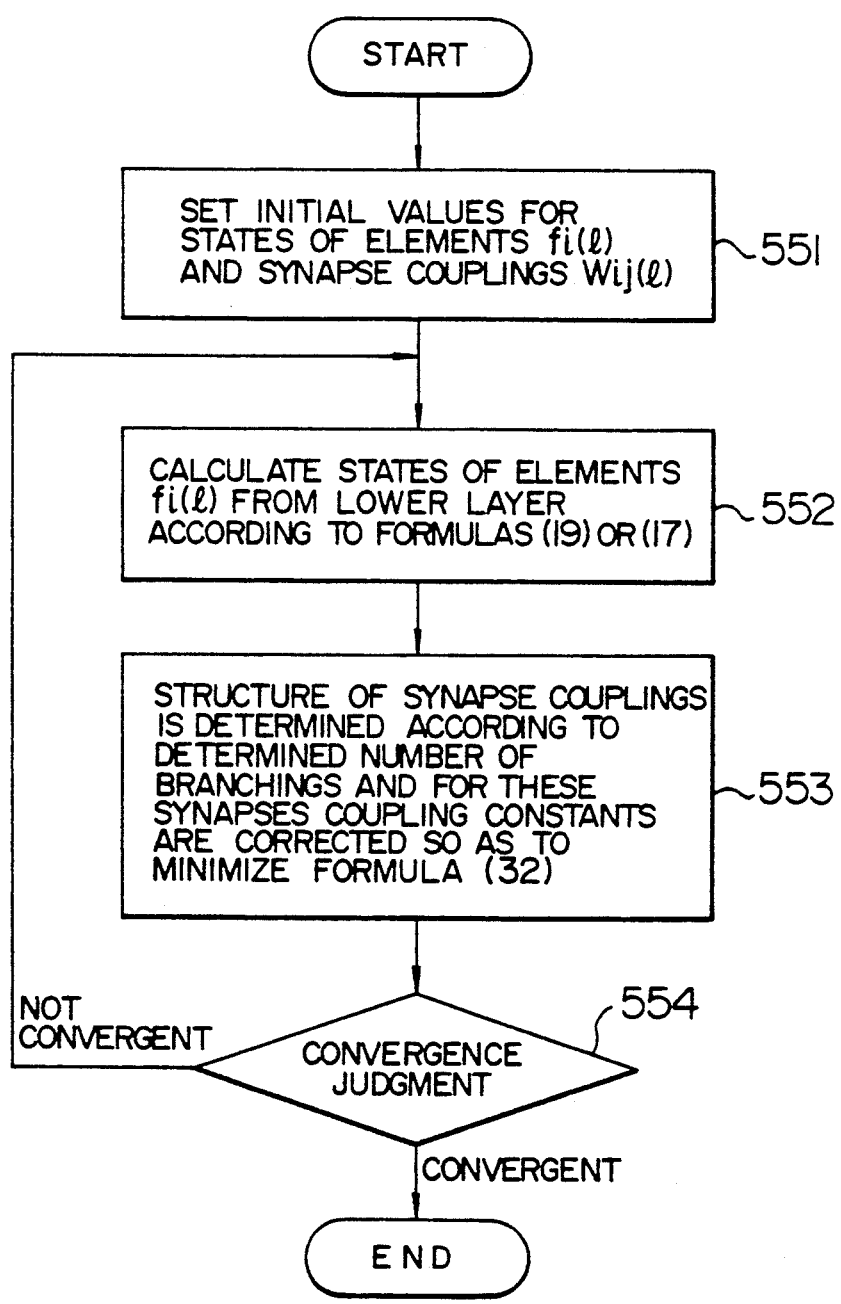

Since information is made correspond to electric current, it is proportional to the area of the cross-section $4\pi R_n^2$ of the tree-like protrusion of the transmission medium (Formula (22)) and the amount of information, which can be transmitted for one distribution, is $\frac{1}{2}$. FIG. 5(d) shows variations in the ratio of the amount of information 542, which can be transmitted, depending on the number of branchings 541. From this figure, after 6 branchings, it is reduced to an order of 1% of the initial amount of information, which means that the information transmission is substantially impossible. Further, after about 3 branchings, it is reduced to 10%. That is, in practice, it is sufficient to take 3 to 4 branchings into account. For example, when a case where a neural element 545 is coupled with elements in the succeeding upper layer 543, is considered, it is sufficient to take only the coupling with a group of elements 544 of $2^4 = 16$ around an element, which is located just above the element 545, into account. Here it is supposed that a tree-like protrusion is bifurcated from the central element towards elements close thereto, in the order of increasing distance, one after another.

Since the amount of information transmitted by the tree-like protrusion is expressed by the magnitude $W_{ij}$ (Eq. (16)) of the synapse coupling in an artificial neural network, the magnitude of $W_{ij}$ should be varied according to the Table indicated in FIG. 5(d). For example, if starting points are couplings of elements located at same positions in an upper layer and a lower layer adjacent to each other, $W_{nn(i),i}/W_{i,i}=0.5$, $W_{sn(i),i}/W_{i,i}=0.25$, etc. are valid, where nn(i) represents the element closest to an element; and sn(i) the second closest element. It is a matter of course that, if the memory is taken into account, the synapse coupling should be modified by learning. However it is conceivable that the degree of modification effected thereby is small. Consequently it can be thought that the ratios described above don't vary so remarkably. Hereinbelow a concrete learning rule is considered.

The back propagation method, which is a conventional learning method, is discussed in detail in "Parallel Distributed Processing I and II" (MIT press, 1986). The basic conception is that synapse couplings are determined from an upper layer to a lower layer successively so that the following square error e is minimized, using the output $f_i(L)$ given by Eq. (20);

$$e = \frac{1}{2} \sum_i \{f_i(L) - d_i\}^2 \rightarrow \text{minimized} \tag{32}$$

Concretely speaking $de/dW_{ij}(l) = 0$ $(l = L, L-1, \cdots, 2)$ are determined one after another by the method of steepest descent. By the back propagation method the synapse couplings formed among all the elements are corrected one after another, using Eq. (32). For this reason, since the necessary calculation time is proportional to the number of synapses $N^2(L-1)$, it is no practically efficient learning method. However, for example, if the structure of the synapse coupling is as indicated in FIG. 5(d), the total number couplings is $16N(L-1)$, which is 16/N times as small as the number described previously. If 1000 elements are considered, the former is only 1.6% of the latter. Even if the number of branchings is 5, it is only about 3.2%.

Algorism

Hereinbelow the processing procedure will be explained, referring to FIG. 5(e).

① Start of calculation
② Set initial values for states of elements $f_i(l)$ $(l=1, 2, \cdots, L)$ and synapse couplings $W_{ij}(l)$ $(l=2, 3, \cdots, L)$. (Block 551)
③ Either the states of elements $f_i(l)$ are calculated, starting from the given input, from the lower layer to the upper layer one after another according to Eq. (19) or $f_i(l)$ is determined by executing the minimization, using the formula (17). (Block 552)
④ The structure of the synapse coupling according to the number of branchings is determined as indicated in FIG. 5(d) and for these synapses their coupling constants $W_{ij}(1)$ are corrected successively from the upper layer to the lower layer so as to minimize the formula (32). (Block 553)

⑤ The convergence is judged. If it is not convergent, ③ and ④ are repeated and if it is convergent, the process proceeds to the following step ⑥, END. (Block 554)

⑥ End of calculation

Apart from the learning method considered in the above, there are alternative proposals as indicated below.

Alternative Proposal 1

The conventional back propagation method and the method indicated by the algorithm in FIG. 5(e) are based on the supposition that all the synapse couplings $W_{ij}$ are independent from each other. Thus, by the learning method considered above, on the basis of the physiological knowledge, the structure of the coupling necessary and sufficient from the point of view of the transmitted information was determined. As the result, it was made possible to shorten the time necessary for the learning. However, in an artificial neural network it is possible to reduce the number of synapse couplings from another point of view.

Now, it is supposed that all the neural elements are coupled between different layers. The synapse couplings $W_{ij}(l)$ are generated by another variable $\xi_l(l)$. That is, they are generated by a variable having a lower dimension, instead of the initial $N^2$ coupling variables. Denoting the dimension thereof by M, it is supposed that;

$$W_{ij}(l) = \omega[\xi_k(l)].$$

$$M < N^2 \qquad (33)$$

where $\omega$ is a generating function and $\xi_k$ (k = 1, 2, ..., M) is a variable of dimension M. Eq (33) represents a generalization of the method indicated in FIG. 5(a). A state, where an element i in a certain layer is coupled with each of the elements in the upper layer adjacent thereto, is considered. Supposing that the synapse coupling $W_{ij}$ represents an electric current and $R_{ij}$ a diameter of the cross-section thereof, $R_{ij}$ may be determined so as to minimize;

$$\sum_j \left( \frac{W_{ij}^2}{R_{ij}^2} + (4\pi R_{ij}^2) \times \text{coefficient} \right). \qquad (34)$$

where if $R_{ij}=0$, it is thought that there is no coupling between (i, j).

Alternative Proposal 2

By the methods described up to now, when a teacher pattern $d_i$ 516 is given, the synapse couplings are corrected successively from the upper layer to the lower layer so as to minimize the square error the formula (32). Apart from such a repetition method, there is another method, by which the synapse coupling can be determined rapidly. That is, it is determined analytically.

The function F expressed by Eq. (20) is a non-linear saturation function. For example a sigmoid function is used therefor. Roughly speaking, the sigmoid function can be divided into saturated parts and a part put therebetween, which can be transformed into a linear form. This linear transformation is approximated by $F = A + Bx$. Now, supposing a case where all the elements behave in this part, the synapse coupling is determined. In the present invention, a 3-layered neural network is considered as an example. When Eq. (20) is rewritten by using this approximation.

$$A + B\{A \Sigma W_{ij}(3) + B \Sigma W_{ji}(3) \Sigma W_{jk}(2) I_k\} = d_i \qquad (35)$$

is obtained. It is sufficient to determine $W_{ij}(3)$ and $W_{ij}(2)$ satisfying this equation. For example, supposing a separable type synapse coupling such as $W_{ij}(3) = \eta_i(3)\xi_j(2)$, they can be determined as follows;

$$W_{ij}(3) = \frac{d_i - A}{B^2 \sigma^2 \sum_j I_k^2} \cdot \zeta_j \qquad (36)$$

$$W_{ij}(2) = \zeta_i I_j$$

where $\zeta_i$ is a random variable, whose average value is 0 and whose variance is $\sigma^2$. When the synapse coupling thus defined is used, it is necessary no more to repeat the procedure required by the conventional techniques.

In practice, since all the elements don't work in their linear region, Eq. (36) is not valid therefor and they should be dealt with separately.

Eq. (36) has another manner of utilization. In general, by the back propagation method, etc. according to the conventional techniques, a better result will be obtained, when the initial value of the synapse coupling is generated by using random numbers having small values. This is because, if the network is in the state most unstable in the initial state, it can be thought that the value converges rapidly into a stable state. That is, Eq. (36) can be used as the initial value for the synapse coupling.

Alternative Proposal 3

Figure 5F:
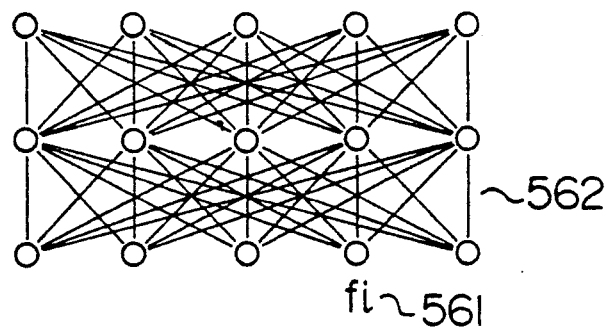
Figure 5F:
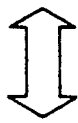
Figure 5F:
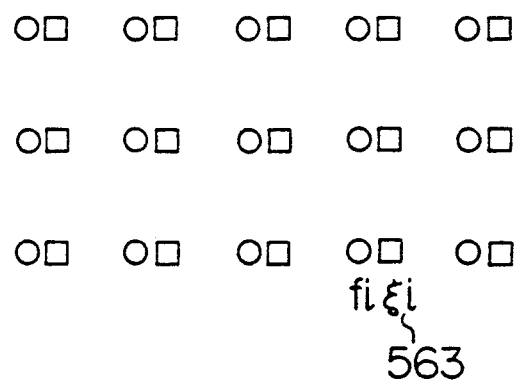

By the conventional method, although there were differences in the calculation algorithm, it was divided into a part for calculating the state of elements and a part for modifying the synapse coupling by learning. However, apart from the easiness of the intuitive thinking, it is not necessary to calculate them separately. Here an algorism executing both of them simultaneously is shown. The learning as well as the part for calculating the state of elements are based, similarly to that based on Eq. (32), on the minimization of the energy according to the thought of Hopfield described above. The energy, for which both the state of elements and the learning are taken into account, is represented by;

$$E = \sum_i \left( -\sum_j W_{ij}(l) f(l) f(l-1) \right) + \qquad (37)$$

$$\frac{k}{2} \sum_i \{f(L) - d_i\}^2 \rightarrow \text{minimized}$$

where k is a positive constant. When the procedure is formulated in this way, it is possible to determine simultaneously both the state of elements $f_i(l)$ 561 and the synapse coupling $W_{ij}(l)$ 562 (FIG. 5(f)). That is, since the repetition of the determination of state of elements→synapse coupling is no more necessary, but they can be executed simultaneously, this method is suitable also for implementing parallel computers.

A simpler formula can be obtained, if the separable type synapse coupling introduced previously $W_{ij}(l) = \xi_i(l)\xi_j(l-1)$ is introduced, where $\xi_i(l)$ represents a new variable 563. If this formula is substituted for $W_{ij}(l)$ in Eq. (37)

$$E = -\Sigma\Sigma F_i(l)F_j(l-1) + \frac{k}{2}\sum_i \{f_i(L) - d_i\}^2 \qquad (38)$$

is obtained and thus the number of variables, which are be determined, is reduced to $N(L-1)$, where $F_i(l) = \xi_i(l-1)f_i(l)$.

3.2 Short term memory

Figure 5G:
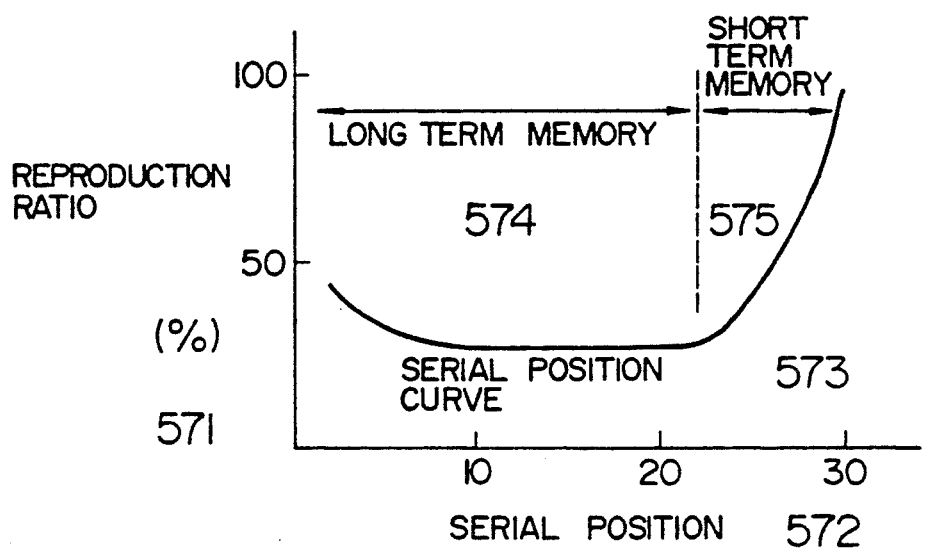

In a word, the long term memory is a mapping of information on synapse couplings or coding. The short term memory stores information by a method completely different from the mechanism of the long term memory. FIG. 5(g) shows results of a psychological experiment on the memory disclosed in "Human Information Processing: An Introduction to Psychology", 1977 by Lindsay and Norman. 19 subjects listened to 30 words having no relation therebetween, which were presented to them with a rate of 1 word per second. A time of 1.5 minutes was given to each of the subjects for every termination of presentation of lists. They were asked to write all the words, which they could remember, in any order which they liked. 5 to 10 seconds after they had finished to write them a new list was presented. The procedure identical to that described above was repeated 80 times. A serial position curve 573 is a curve obtained by representing the reproduction ratio 571 at this time in the function of the serial position 572 indicating the order, in which the words have been presented. The feature of this curve is that the reproduction ratio decreases up to an about 7th word counted from the word most newly presented and that it remains almost equal for the words preceding it. The former part is made correspond to the short term memory 575 and the latter part to the long term memory 574.

The short term memory is a mechanism, by which data given to a person are temporarily stored. Necessary data are selected among these data according to a certain criterion, for which data the procedure proceeds to the long term memory. The memory intending conventional technological applications was the long term memory and no attention was paid to the short term memory, consequently it is necessary to select previously necessary data among given data before storing them. That is, the judgment of the selection should be newly considered as a preliminary processing outside of the neural network. On the contrary, the neural network having the mechanism of the short term memory can incorporate such a selection mechanism in the network.

Further the short term memory has an important aspect concerning the passage to the long term memory. As described previously, in the short term memory, the synapse coupling presents no plasticity, but it is constant. In order to be able to store information with unchangeable synapse coupling, the synapse coupling should be determined according to some rule. Therefore, when the procedure passages to the long term memory, if the coupling structure differs remarkably from that rule, the succeeding short term memory becomes impossible. That is, the approximate value of the synapse coupling is determined at the point of time of the short term memory. Therefore, in the following, a model, which can explain the psychological realization of the short term memory seen in the serial position curve, will be constructed and at the same time the rule imposed on the synapse coupling will be elucidated.

An equation system representing the behavior of the state of the neural elements can be described by Eq. (16) or Eq. (19). Since both the equations are deduced from equivalent mechanisms, here Eq. (16) is considered. At first, it is considered how the memory in the short term memory can be expressed in Eq. (16). Since the synapse coupling $W_{ij}$ is invariant, it cannot be coded in $W_{ij}$ as for the long term memory. Therefore the short term memory is made correspond to the minimum of Eq. (16). According to the serial position curve 573, since it is shown that about 7 states can be memorized, corresponding thereto, a number of minimum values around that number are necessary. That is, the condition imposed on the synapse coupling therefor will be obtained. Now, supposing that $W_{ij}$ = const. (independent of i and j), in the case where the number of element is sufficiently great, depending on the sign of the threshold value $\theta$, $x_i = -1$ or $x_i = 1$ gives the smallest value of Eq. (16). When the dynamic process of Eq. (16) is considered, there exist no minimum values other than these values, but the state where all the neural elements have a same value is only one memory. Consequently the supposition that $W_{ij}$ = const. (independent of i and j) cannot explain the serial position curve.

The dynamic process to the minimum value of the energy is memorized by using the following probability equation.

$$\frac{\partial}{\partial t} P(\{x\}, t) = -\Sigma[\omega(x_j)P(\ldots, x_j \ldots, t)] \qquad (39)$$

where P represents the probability distribution, in which the state is $\{x\}$ at a time t and $\omega$ the transition probability. The necessary condition in order that the probability equation stated above gives a stationary distribution $\exp(-E(\{x\}))$ is expressed by $$\omega(x_j) = \tfrac{1}{2}[1 - x_j\tanh E_j] \text{ and } E_j = \sum_k W_{jk}x_k - \theta.$$

Instead of integrating directly Eq. (39), the average value of the state $x_i$ $$<x_i> = \sum_{\{x\}} x_i P(\{x\}, t) \qquad (40)$$

is considered.

Figure 5H:
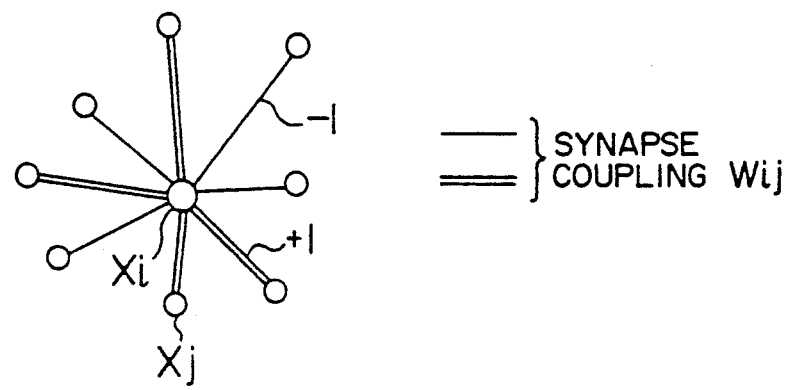

Here it is supposed that the synapse coupling $W_{ij}$ takes the following values (FIG. 5(h));

$$W_{ij} = \begin{cases} +1, p \text{ adjacent elements} \\ -1, r \text{ adjacent elements} \end{cases}$$

Figure 5I:
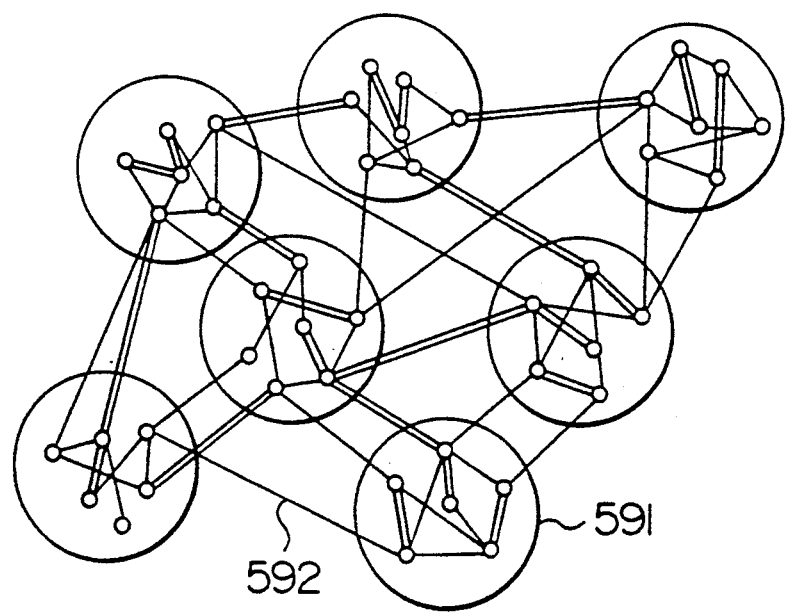

Now, as the experiment for obtaining the serial position curve, the situation where words are presented to subjects one after another is considered. At this time the groups of neural elements 591 (FIG. 5(i)) corresponding to these words are turned to the ignition state one after another. Of course the groups of elements can be overlapped on each other. In any case, the fact that the words are presented one after another corresponds to that of the number of elements coupled in each of the elements (group) increases. That is, (p+r) increases. Therefore the behavior of the average value $<x_i>$ of the state of elements in function of p+r will be examined.

According to Thouless, Anderson and Palmer (Philosophical magazine, Vol. 35, p. 583, 1877), executing Eq. (40), the average value $<x_i>$ varies approximately according to the following equation;

$$\frac{d}{dt}<x_i> = -<x_i>$$ (41)

$$\tanh\left[\sum_k W_{ik}<x_k> - \sum_k W_{ik}^2(1-<x_k>^2)<x_i>\right]$$

Figure 5J:
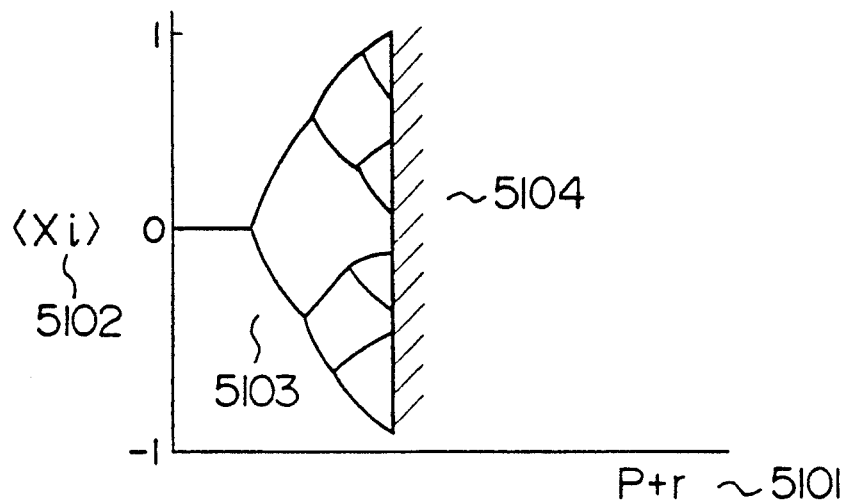

In general, since different $<x_i>$s correspond to different stationary states, the number of stationary solutions of Eq. (41) is equal to the number of short term memories. As disclosed also in "Digital dynamics and the simulation of magnetic systems" (Physical Review B, Vol. 28, pp. 2547-2554, 1983) by Choi and Huberman, the result is indicated in FIG. 5(j). When the number of elements (p+r) 5101 is small, there exists only one stationary state 5102. The bifurcation takes place, as (p+r) increases, and thus the number of stationary states increases in the form of a tree 5103 as 2, 4, 8 and so forth. However, when the value of (p+r) increases further, exceeding that giving 8, there exist no stationary states, which gives rise a chaotic state 5104. That is, there don't exist more than 8 stationary states (minimum values of energy) in this neural network.

From the result described above it was recognized that the short term memory can be realized by using a neural network having positive and negative random synapse couplings. Further, from the consideration described above, it can be understood that almost random synapse couplings may be presumed also for the long term memory.

Hereinbelow some embodiments of the present invention will be explained, classifying them into several items for different objects of application.

1. Recognizing problem
1.1 Recognition of moving images
1.2 Initial visual sensation
2. Control problem
2.1 Control of movement
2.2 Optimum control
3. Mathematical problem
3.1 Method for solving non-stationary partial differential equations 1. Recognizing problem
1.1 Recognition of moving images In FIG. 2 a neural network for high order information processing was constructed, starting from an orientation selective extracting circuit in the visual sensation in the cerebral cortex. Here a neural network for recognizing moving images will be constructed by applying this network.

According to psychological knowledge, when a person recognizes an object, concurrent or competitive actions of physical signals (images) of a body, which is an object to be recognized, and conceptions (images) are necessary. There are many cases where the recognition is not possible only by one of them. That is, features are extracted from a number of physical signals entering the system, which are unified, and a significant recognition is effected by matching them with the memory.

Figure 1:
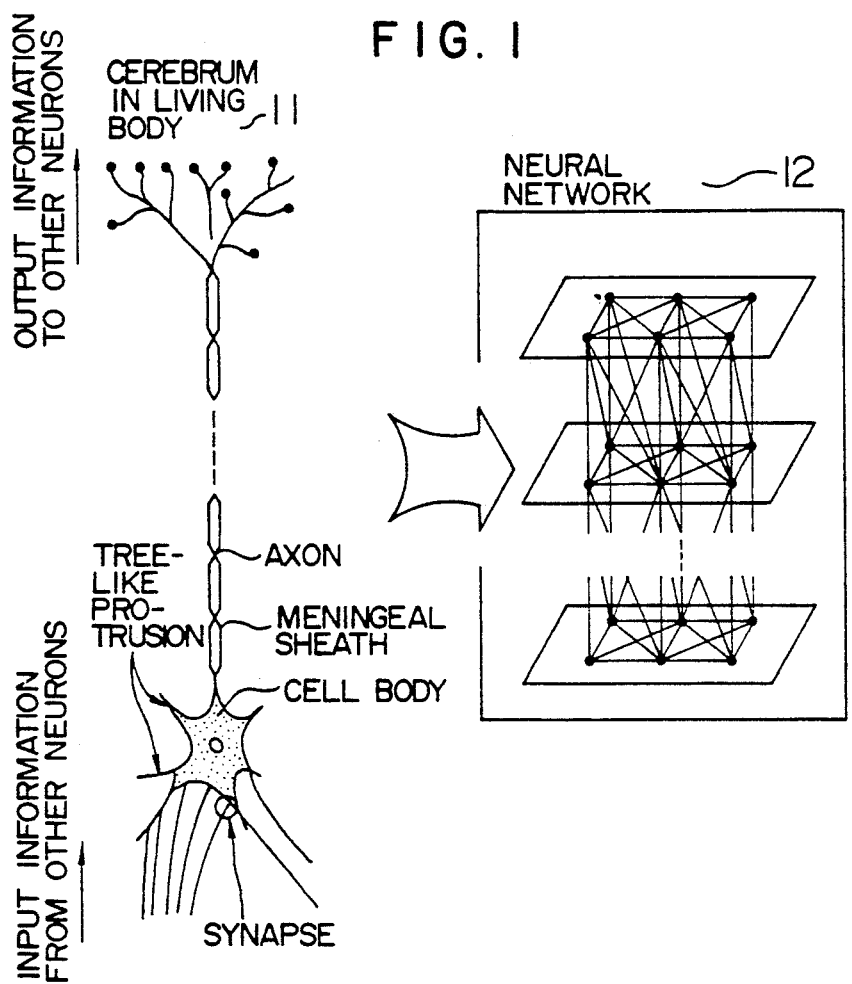
FIG. 1 is a scheme showing the conception of an embodiment of the present invention.
Figure 2:
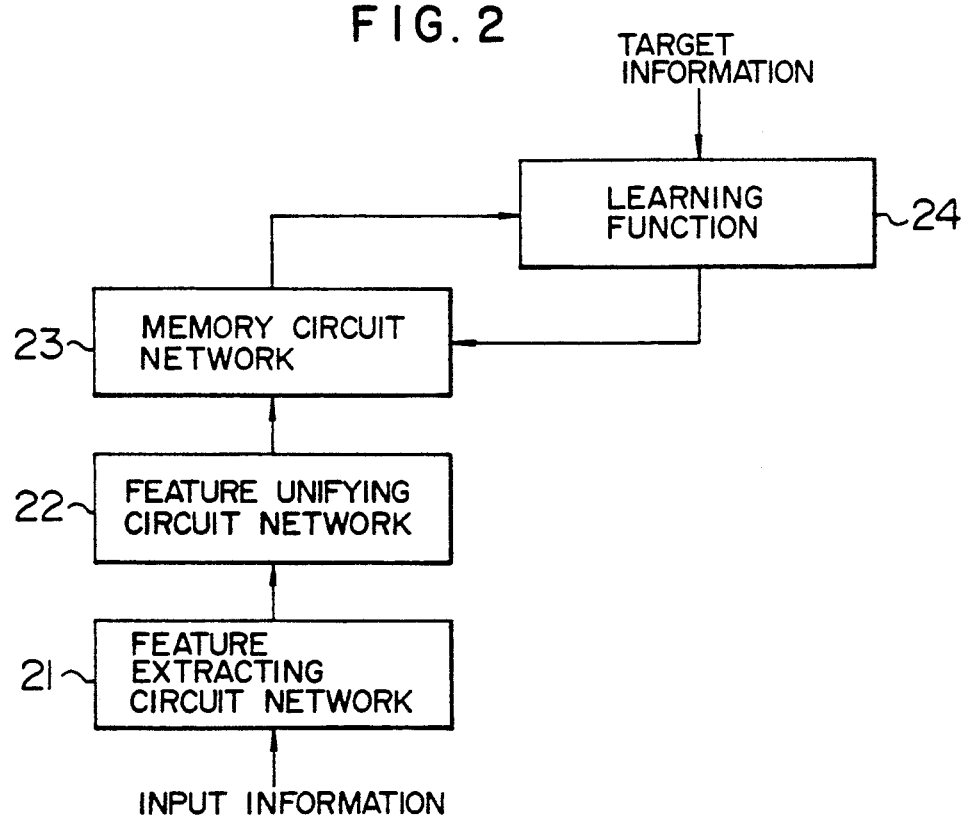
FIG. 2 is a scheme showing a method for constructing a neural network.
Figure 6A:
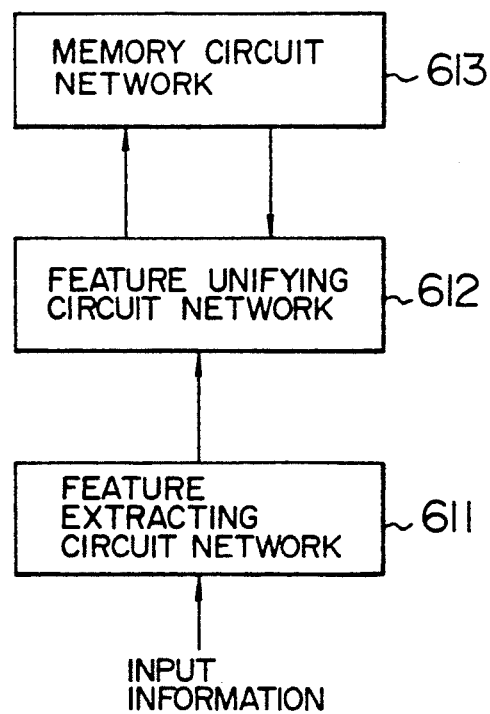
FIGS. 6a–6c are schemes illustrating an example of application to the image recognition.

Consequently, in addition to the general structure indicated in FIG. 2, a feedback mechanism from the memory to the feature unification is necessary (FIG. 6(a)). Primitive features are extracted from the input by means of a feature extracting network 611 and these primitive features are unified by means of a feature unifying network 612, which are matched with images stored in a memory network 613. Images 621 and 622 corresponding to 2 frames measured in a unit time are compared as input information to obtain variations in the gradation. This comparison is effected for every mesh in the images to confirm the presence of movement. However, since it is not known the direction of the movement, in the input image 623, the pixels, where variations have taken place, are marked. Further, since the direction cannot be judged by this alone, information on the approximate direction exists separately.

Figure 6C:
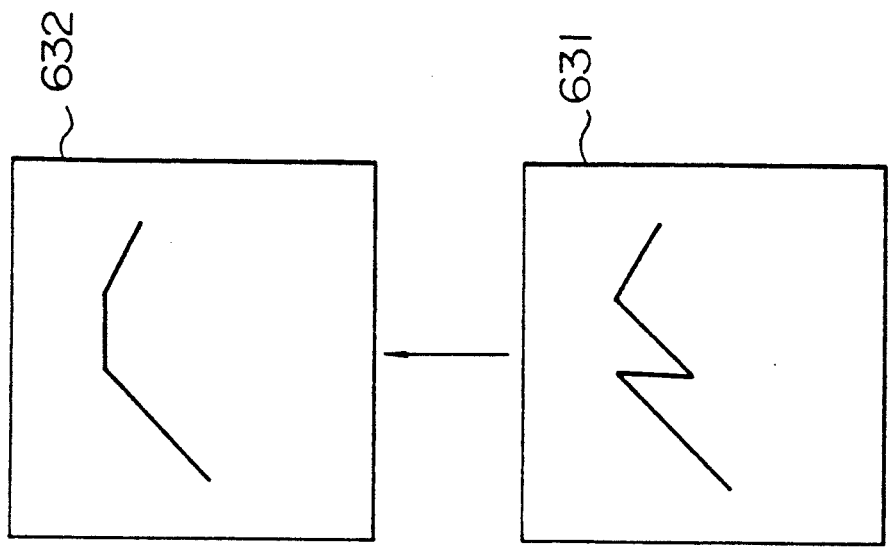
Figure 6B:
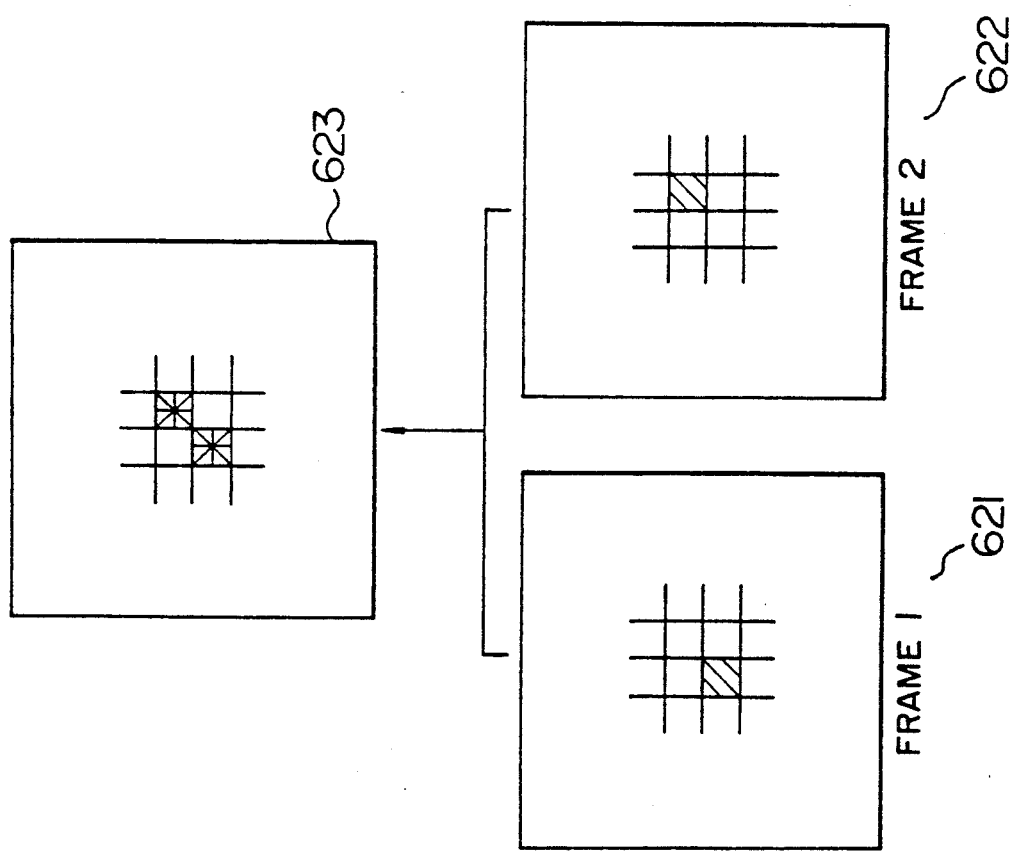

The linear direction of the movement is extracted from the image thus prepared by means of the feature extracting network 611 indicated in FIG. 6. Further the feature unifying network 612 determines the direction of the movement by using the extracted linear direction as a group of continuous straight lines 631. However, in general, there is no unnatural movement as indicated by 631 in FIG. 6(c). That is, conceptions on the movement, concretely speaking, that the movement follows a smooth curve 632, etc. are incorporated in a memory network 613. In this way a smooth curve 632 is constructed by matching them.

1.2 Initial visual sensation

Various processings such as the recognition of the movement direction, the reproduction of the depth, etc. in the initial visual sensation can be formulated as an inverse problem of the problem of identifying the solution from the input data. That is, a system of equations deduced spontaneously from the problem, which is the object, and limiting conditions based on some apriori information are necessary, because the solution cannot be determined only by the system of equations. Now, denoting the variable to be obtained by x and input data by I, the problem can be formulated as a minimization problem as follows;

$$E(\{x\})=E_1(\{x\}, \{x\})+\lambda E_2(\{x\})$$ (42)

where $E_1$ represents the energy corresponding to the system of equations, $E_2$ that corresponding to the limiting conditions, and $\lambda$ a parameter indicating the ratio of them. Consequently the method described for Eq. (17) can be utilized efficiently.

In the following, in order to consider a concrete formulation, the movement direction sensation will be examined. Since the input image (two-valued) I is constant with respect to the movement direction and remains unchanged, $$\partial I/\partial t+(\nabla I)\cdot V=0$$ (43)

is valid, where $\nabla=(\partial/\partial x, \partial/\partial y)$, $V=(V_x, V_y)$, t represents the time, $\nabla$ the differential vector, and V the velocity vector of the movement direction. The energy $E_1$ is obtained by integrating the square of the above formula. Next, as the apriori constraint conditions, in the meaning of eliminating the noise, it is supposed that $$E_2=\int\int\{(\nabla\cdot V_x)^2+(\nabla\cdot V_y)^2\}\,dx\,dy$$ (44)

Adding them together, $$E = \int\int \{I_x^2 V_x^2 + \lambda(\nabla \cdot V_x)^2 + I_y^2 V_y^2 + \lambda(\nabla \cdot V_y)^2 + 2\partial I/\partial t(I_x V_x + I_y V_y) + 2I_x I_y V_x V_y\} dx dy \quad (45)$$

is obtained. Since the image is divided in the form of a mesh, when suffixes i and j, which are integers, are attached in the x and y directions, respectively, the above equation can be transformed into;

$$E = \sum_{ij} \{W_{ij}^x V_{xi} V_{xj} + W_{ij}^y V_{yi} V_{yj}\} \cdot \sum_i \{h_i^x V_{xi} + h_i^y V_{yi}\} + 2I_{ni}I_{yi}V_{xi}V_{yi} \quad (46)$$

where $$W_{ij}^x = (I_{xi}^2 + 2)\delta_{ij} - 2\lambda \delta_{i,i-1}$$

$$W_{ij}^y = (I_{yi}^2 + 2)\delta_{ij} - 2\lambda \delta_{i,i-1}$$

$$h_i^x = 2\partial I/\partial t I_{xi}$$

$$h_i^y = 2\partial I/\partial t I_{yi}$$

Further, by using $V_i = (V_{xi}, V_{yi})$, it can be summarized as follows:

$$E = \sum_{ij} W_{ij} V_i V_j + \sum h_i V_i \quad (47)$$

where $W_{ij}$ and $h_i$ can be deduced easily from the definition formula stated above.

Utilizing Eq. (17) here, the problem can be lead to the maximization problem of the probability expressed by the following formula:

$$\int_i \exp\left[\frac{1}{2}\Sigma Z_i^2 + \sum_{ij} Z_j (W^{\lambda})_{ij} V_i + \sum_i h_i V_i\right] dZ_i \quad (48)$$

The maximization of this formula can be executed by using the simulated annealing method, etc.

2.1 Movement control

Figure 7A:
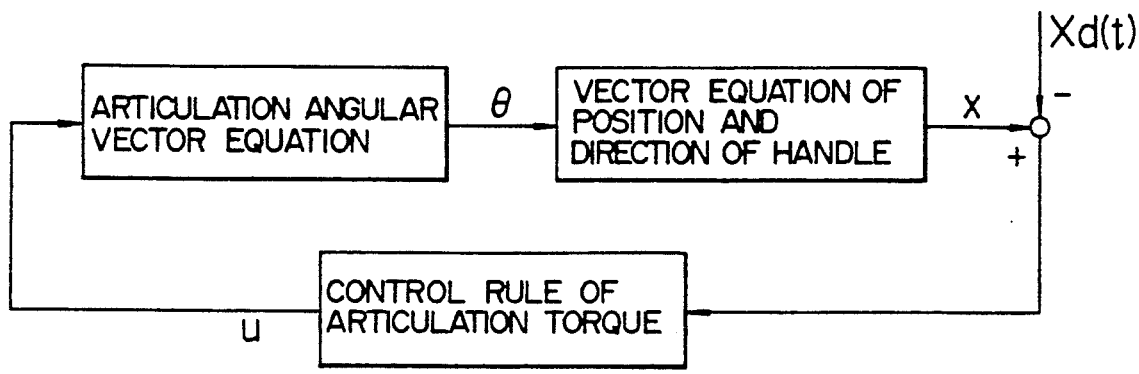
FIGS. 7a–7b are schemes illustrating an example of application to the movement control.

It is to determine the input u(t) to the system so as to follow the trajectory $d_d(t)$ of the target depending on the time, just as for the control of a robot manipulator, to effect the movement control (FIG. 7(a)).

Explanation will be made, by taking a robot manipulator as an example. Now, denoting an n-dimensional articulation angular vector by $\theta$, the movement equation can be given by;

$$R(\theta)(\ddot{\theta}) + A(\theta, \dot{\theta}) + B(\theta) = u \quad (49)$$

where the first term in the left member is an inertia term; the second term is a Coriolis' centrifugal force term; the third term is a gravitation term; and the right member represents the n-dimensional articulation torque. On the other hand, denoting the direction vector indicating the position of the handle of the manipulator by x, from the principle of the kinematics, $$x = f(\theta), \dot{x} = J(\theta)\dot{\theta} \quad (50)$$

$$\ddot{x} = H(\theta)\dot{\theta} + J(\theta)\ddot{\theta} \quad (51)$$

are valid, where $J(\theta)$ represents a Jacobian. From the movement equation with respect to x the vector P of the force acting on the handle, i.e. moment, can be expressed by;

$$u = J^T(\theta) P \quad (52)$$

where T represents the transposition of the matrix. It is to determine the time dependence of the articulation angle u(t) so that the position and the direction x(t) follows $x_d(t)$ to effect the movement control (FIG. 7(a)).

However, for the control of the robot manipulator, the determination of a model with a perfect precision is almost impossible because of the non-linearity of the dynamic characteristics and the undeterminacy of the parameter as well as the non-linearity between the operation space and the articulation space, etc. Consequently it is necessary at first to identify the dynamic characteristics of the system by means of the neural network. Therefore the dynamic process of the neural network having the time dependence is defined as follows;

$$\tau \dot{x}_i(l) = -x_i(l) + \sum_j W_{ij}(l) y_j(l-1) \quad (53)$$

$$l = 2, 3, \ldots, L$$

$$y_i(l) = \theta(x_i(l)) \quad (54)$$

where $\tau$ is a time constant and $\theta$ represents the threshold function. Further u is inputted in the input layer and for the output layer it is a component of $x_i(L) = x$. The synapse coupling $W_{ij}(l)$ has the time dependence or it is constant.

Figure 7B:
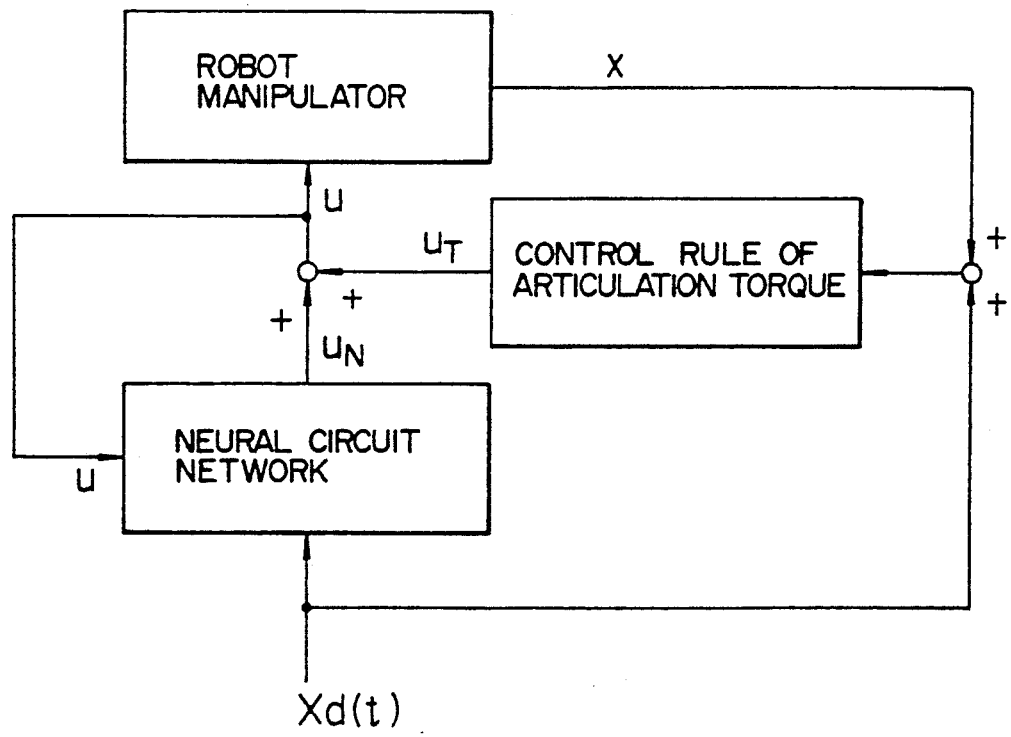

As soon as the neural circuit network has learned and the learning is terminated, FIG. 7(b) indicates a simple feedforward control. That is, as long as the output x of the robot manipulator differs from the target trajectory $x_d(t)$, $u_T$ is calculated by using control rule of the articulation torque, depending on the difference $x - x_d(t)$ Further the articulation torque $u_N$ is calculated from the input $x_d(T)$ to the neural network, which has not yet learned and $u = u_T L u_N$ is inputted in the manipulator as an external force. When the learning is completely terminated, since $u = u_N$ ($u_T = 0$), the torque $u_N$ from the neural network is inputted directly in the manipulator and the process proceeds from the feedback control to the feedforward control.

The learning in the neural network is effected as follows. Just as the back propagation method, by one of the method the synapse coupling is determined so as to minimize the error expressed by;

$$E = \frac{1}{2}\Sigma(x_i(L) - X_{di}(l))^2 \quad (55)$$

that is, the synapse coupling is varied in the course of time by using;

$$\dot{W}_{ij}(l) = -c \frac{\partial E}{\partial W_{ij}(l)} \quad (56)$$

As another method, the $\epsilon$ method proposed by Balakrishnan in the optimum control theory can be utilized. That is, it is to determine u, which minimizes $$E = \int \left\{ \frac{1}{2\epsilon} \sum_i \sum_{l=2}^{L} \| \tau \dot{x}_i(l) + x_i(l) - \right. \quad (57)$$

$$\sum_j W_{ij}(l)y_j(l-1) \|^2 + \tfrac{1}{2}\Sigma(x_i(L) - X_{di}(t))^2 \bigg) dt$$

However, for the input layer (l=2), u is added thereto. A neural network for solving this problem will be described in detail in the following paragraph as a problem of the general optimum control theory.

2.2 Optimum control problem

A useful application of the method described above to the optimum control problem is considered, making the most of the parallel processing power of the neural network. Since the optimum control problem can be formulated in general as the minimization (maximization) of a certain evaluation function, this method can be applied to fairly numerous problems. Here it will be shown as an example that this method can be applied to the $\epsilon$ method proposed by Balakrishnun.

Now it is supposed that the dynamic process of the object system follows a differential equation;

$$\dot{x}(t) = f(x(t), u(t), t), \tag{58}$$

where $x(t_0) = x^0$ and $x(t)$ represents a state variable at a point of time t, f a given function, u(t) an operation variable at a point of time t, and $x^0$ the value of x at the initial point of time $t_0$. Here the minimization of;

$$\int_{t_0}^{t_1} y(x(t), u(t), t) dt$$

is considered, where y is a given function and $t_1$ indicates the final point of time. The problem is to determine the operation variable u(t) and the state variable x(t), which minimize the evaluation function for a system following the dynamic process described above.

By the $\epsilon$ method the problem stated above is formulated as a problem of minimizing:

$$E = \int_{t_0}^{t_1} \left( \frac{1}{2\epsilon} \| x - f(x, u, t)) \|^2 + g(x, u, t) \right) dt \tag{59}$$

where $\| --- \|$ represents the norm in a suitable space. Now, supposing that the inner product $(x, f) \leq c(1 + \|x\|^2)$, c being a constant, it is proved that the solution, which minimizes E by $\epsilon \to 0$, converges to the solution of the initial problem.

In order to express the variables such as x, u, etc. with two-valued variables $X_i$, $U_i$, etc., a transformation expressed by;

$$x = \sum_i 2^i X_i(t), \quad u = \Sigma 2^i U_i(t), \tag{60}$$

where $X_i(0) = \pm 1$, $U_i(0) = \pm 1$, is effected. Then, E is given by;

$$E = \int_{t_0}^{t_1} \left( \frac{1}{2\epsilon} \| \Sigma 2^i X_i - f(X_i, U_i, t) \|^2 + g(X_i, U_i, t) \right) dt \tag{61}$$

Figure 8:
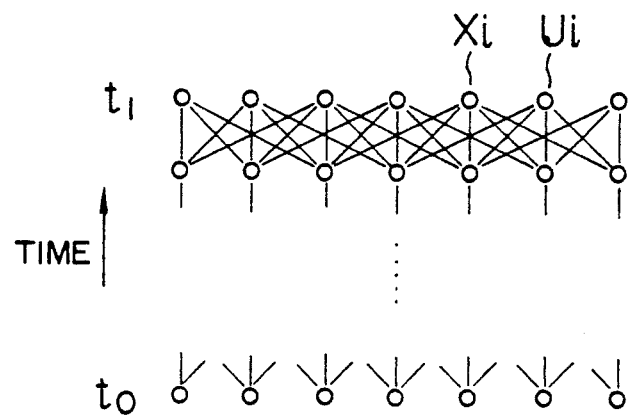
FIG. 8 is a scheme illustrating an example of application to the optimum control.

If the time is divided in the form of a time mesh and each of the elements expresses $X_i$ or $V_i$ in order to execute the mapping on the neural network, a scheme indicated in FIG. 8 is obtained. Each of the layers represents $X_i$ and $V_i$ at a same point of time and the coupling between different layers depends on the given problem and the structure of f and g.

3. Mathematical problem 3.1 Method for solving non-stationary partial differential equations As an application making the most of the parallel processing power of the neural network, a method for solving differential equations and more in general partial differential equations can be enumerated. The feature of the neural network on the basis of the concurrent and competitive action between neural elements is that the action is performed simultaneously and parallelly. However, by the Monte Carlo method, which is a practical calculation approach, a simultaneous and parallel processing is simulated by changing the state of one element per unit time and repeating this process a sufficiently great number of times. This simultaneous concurrent and competitive action play an important role for solving differential equations, as indicated below.

Now it is supposed that a partial differential equation is written as follows;

$$\frac{\partial u}{\partial t} = F(u, \nabla u, \nabla^2 u) \tag{62}$$

Without loosing any generality, here a one-dimensional problem is considered. That is, $u = u(x, t)$, $\nabla u = \partial u / \partial x$, and $\nabla^2 u = \partial^2 u / \partial x^2$, where x represents the position. In order to calculate numerically the equation with respect to the continuous quantity x by means of a computer, x is divided into finite extremely small domains, over which the equation is rewritten. By almost all the numerical calculation method such as the finite differential method, the finite element method, the boundary element method, etc., a continuous equation is rewritten in a discrete equation by such a method. For example, by the finite element method, u in each of the elements is interpolated by using;

$$u = \sum_\alpha \phi_\alpha u_\alpha \tag{63}$$

where $\phi_{60}$ represents interpolation function; $u_\alpha$ values at knots of the finite elements; and $\alpha$ 1 or 2 for indicating one of the two ends of one domain in the one-dimensional case. For a two-dimensional triangular element, $\alpha = 1, 2, 3$. For each of the elements a weighting function is defined as $u^* = \Sigma \phi_\alpha u_\alpha^*$ similarly to that described above. Substituting $\Sigma \phi_\alpha u_\alpha$ for u in the original partial differential equation, multiplying the two members by $u^*$, they are integrated over the whole space. Paying attention to the constant, for which the weighting function $U_\alpha^*$ takes an arbitrary value, the following system of equations is obtained;

$$U_\alpha = \hat{F}(u_\alpha, u_{NN(\alpha)}, u_{SN(\alpha)}) \tag{64}$$

where $NN(\alpha)$ means a term deduced from the primary differential $\nabla u$ and indicates the value at the closet adjacent knot point of $\alpha$, i.e. $\alpha + 1$ or $\alpha - 1$, and $N(\alpha)$ means a term deduced from the secondary differential $\nabla^2 u$ and indicates the value at the second adjacent knot point of $\alpha$, i.e. $\alpha + 2$ or $\alpha - 2$. The equations described above are formed for all the elements and the desired finite equation can be obtained by adding them.

Next it is necessary to rewrite the differential $\dot{u}\alpha$ with respect to time in the form of finite differences. In general, according to the usual method, put $\dot{u}\alpha = u\alpha^n - u\alpha^{n-1}$, where the suffix n means that the time t is rewritten by a discrete variable.

Here, what is a problematical point is which point of time (n or n−1), is taken for the point of time for the function in the right member. In the case where n is taken, it is called the negative solving method, and in the case where n−1 is taken, it is called the positive solving method. At solving a hydraulic equation, in the case where the phenomenon varies relatively slowly and the stationary state is immediately established as a laminar flow, a solution of satisfactorily high precision can be obtained even by the positive solution method. However, for a flow having a high flow speed or a turbulent flow, the unit time should be satisfactorily short and therefore a long calculation time is necessary. If the unit time is too long, the precision is worsened or the process becomes divergent. In such a case the negative solution method is suitable. In general, by the negative solution method the solution is stable and a high precision can be obtained, independently of the unit time. However, in spite of such advantages, by the negative solution method it is required, in general, to repeat to calculate non-linear algebraic equations at each point of time and therefore a long time is necessary therefor.

Making the most of the parallel processing function of the neural network, the difficulty described above of the negative solution method can be solved. The equation to be solved is;

$$u_\alpha^n = u_\alpha^{n-1} + \hat{F}(u_\alpha^n, u_{NN(\alpha)}, u_{SN(\alpha)}^n) \tag{65}$$

Since $u_\alpha$ takes originally a continuous value, the equation should be rewritten with two-values variables. The two-valued variables are also represented by $u_\alpha$. The difference consists only in that the number of elements is increased.

Figure 9:
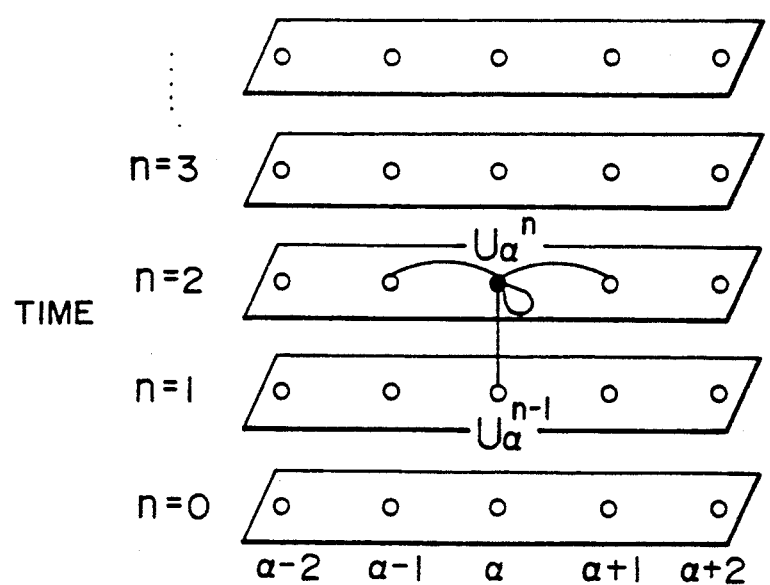
FIGS. 9a–9b are schemes illustrating an example of application to a non-stationary partial differential equation.
Figure 9:
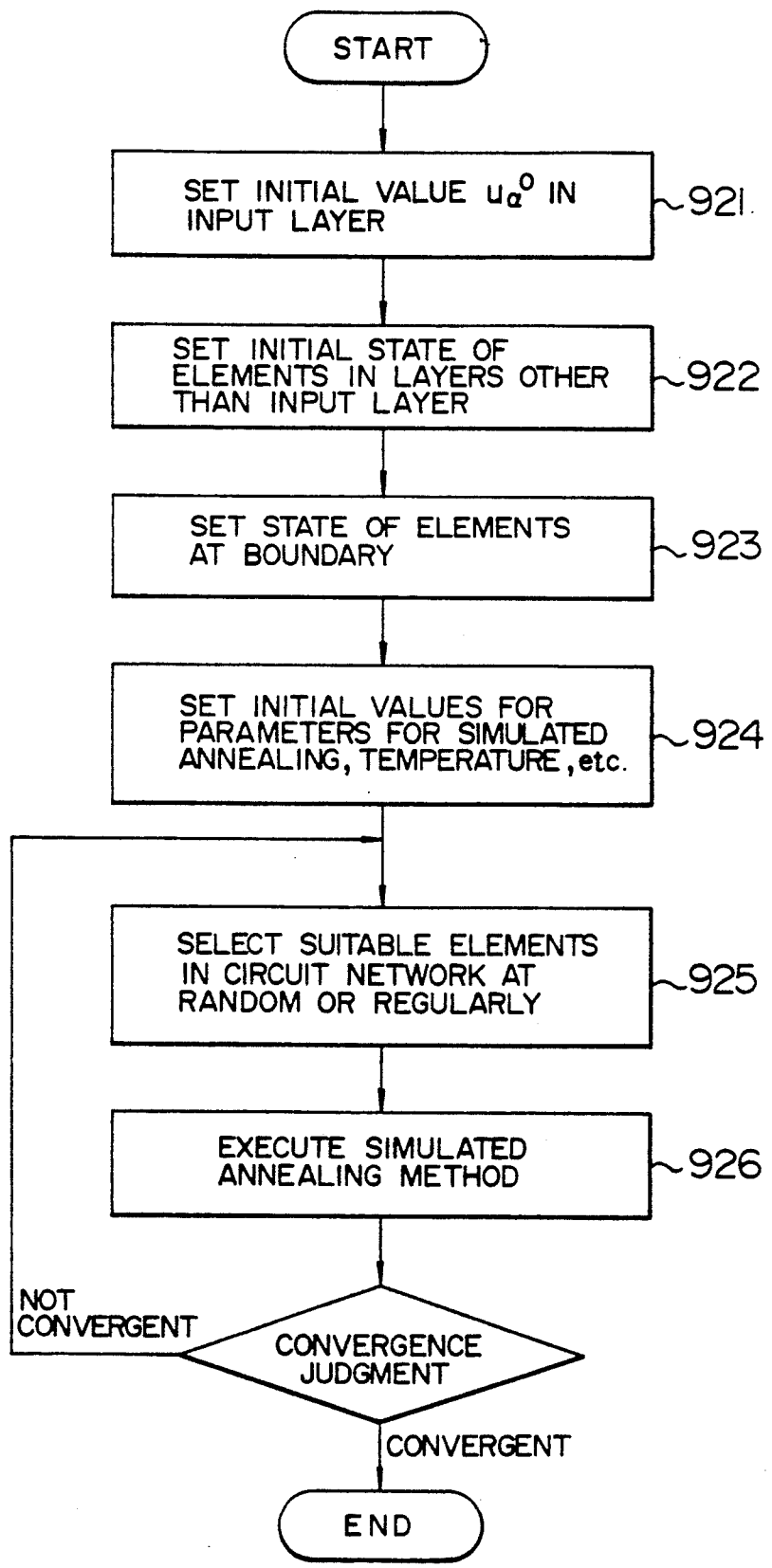

FIG. 9(a) indicates the structure of the neural network. A layer is prepared for every point of time. $u_\alpha^n$ is made correspond to each of the elements. This $u_\alpha^n$ is added to $U_{NN}^n((\alpha))$ and $U_{SN}^n(\alpha)$ at the same point of time, i.e. in the same layer, and coupled with itself. Further, it has a relation also with $u\alpha^{n-1}$ before one unit time. As a concrete algorithm, since the initial value is given for the input layer (n=0), the solution proceeds one after another towards the upper layer. Or the minimization of $$E = \tfrac{1}{2}\Sigma\{\dot{u}_\alpha - \hat{F}(u_\alpha, u_{NN(\alpha)}, u_{SN(\alpha)})\}^2 \tag{66}$$

is effected by the simulated annealing method.

Algorithm

The procedure of the processing will be explained, referring to FIG. 9(b).

① Set the initial value at the input layer (block 921).
② Set the initial state of the neural elements in the layers other than the input layer (block 922).
③ Set the state of elements given at the boundary (block 923).
④ Set the initial value of the temperature, which is a parameter for the simulated annealing method, etc. (block 924).
⑤ Select at random or regularly the elements other than the input layer and the elements located at the boundary in the neural network (block 925).
⑥ Execute the simulated annealing method to change the state of the selected elements (block 926).
⑦ Execute the judgment of the convergence. If it is not convergent, repeat ⑤ and ⑥. If it is convergent, the process proceeds to ⑧ End.
⑧ End.

Next, concerning the problem of determining the function H* for minimizing the cost of Eq. (4) stated above, at first the principle there of will be explained.

It is known that the formal solution of this problem is as follows. The optimum function H* for H is determined so as to give the minimum value of the right member of;

$$-\partial V(t,x)/\partial t = \min\{-\Gamma H, \\ \partial V/\partial x + \Gamma \partial^2 V/\partial x^2 + L/2(H'/E)^2\}H' \tag{68-1}$$

as follows;

$$H^* = L^{-1}\Gamma E^2 \partial V/\partial e \tag{68-2}$$

Since it is known that in general, the temperature is in the relation expressed by $T=0(\Gamma)$ with respect to additive noise, $\partial V/\partial x = 0(\Gamma^{-2})$ is valid, where the notation $O(\ldots)$ means the order of magnitude of ---, Rearranging Eq. (68-1) by using this, the equation, which V should obey, is given by;

$$-\partial V(t,x)/\partial t = -\tfrac{1}{2}L^{-1}\Gamma^2 E^2\{\partial V/\partial x\}^2 + \Gamma \partial^2 V/\partial x^2 \tag{69}$$

for which the initial condition is given by;

$$V(t_1, x) = t_1.$$

Since this initial condition gives the value at the final point of time, in order to rewrite it in the form of an initial value problem, which is easy to deal with, it is transformed by using a new time $\tau$ given by $\tau = t_1 - t$. Then, the equation stated above is transformed into;

$$\partial V(\tau, x)/\partial t = -\tfrac{1}{2}L^{-1}\Gamma^2 E^2\{\partial V/\partial x\}^2 + \Gamma \partial^2 V/\partial x^2 \tag{70}$$

where $V(O, x) = 0$. This is the final equation for determining V, i.e. H*.

Finally the problem is to solve the equation expressed by Eq. (70) and to obtain V. It is a matter of course that it is possible to solve this problem numerically. However this method takes a long CPU time and further it has not even any practical simplicity. Therefore, an analytical solution is desired. Here an approximate analytical solution is obtained by using a special perturbation, where $\Gamma$ is an extremely small parameter. The state x giving the maximum value of P is represented by $\alpha^*$. Although this value itself is unknown, it is possible to examine the behavior of the solution in the proximity thereof. Therefore, paying attention to $\partial V/\partial x = O(\Gamma^{-2})$, the magnitude concerning in the right member of Eq. (70) is evaluated. Now, supposing that the state x is located in the neighborhood of $\alpha^*$, which is away therefrom only by $\sqrt{\Gamma}$ (inner region: $x = \alpha^* + O(\Gamma)$), since the first term is $O(\Gamma^{-1})$ and the second term is $O(\Gamma^{-3/2})$, the second term is important. On the other hand, in the case where the state x is away from $\alpha^*$ by a distance greater than $\Gamma^0$ (outer region: $x = \alpha^* + O(1)$), since the first term is $O(\Gamma^{-2})$ and the second term is $O(\Gamma^{-1})$, the first term is predominant. Consequently separate solutions are obtained for these regions, which may be jointed smoothly. In the following, in each of the regions, approximate solutions up to $O(\sqrt{\Gamma})$ are constructed.

(1) Inner region; $x = \alpha^* + O(\sqrt{\Gamma})$

Since it is thought that this region is almost achieved at $\tau = 0$, as it is understood from the initial condition, the value of V is small and the first term can be neglected approximately. Denoting the solution in this region by $V_i$, the approximate equation up to $O(\sqrt{\Gamma})$ is given by a doffusion equation, which is;

$$\partial V_i(\tau, x)/\partial \tau = \Gamma \partial^2 V_i/\partial x^2 \tag{71}$$

The solution satisfying the condition given by Eq. (71) can be easily obtained as follows;

$$V_i(\tau, x) = \Gamma \tau \exp\{-(x-\alpha^*)^2/2\Gamma\tau\} \tag{72}$$

By $\tau \to 0$, clearly $V_i(0, x) \to 0$. Here, since $\alpha^*$ is unknown, this formula cannot be used, as it is. This meaning will be elucidated later.

(2) Outer region; $x = \alpha^* + O(1)$

Denoting the solution in this region by $V_0$, an approximative equation up to $O(\Gamma)$ is given by;

$$\partial V_0(\tau, x)/\partial \tau = -\tfrac{1}{2}L^{-2}\Gamma^2 E^2\{\partial V_0/\partial x\}^2 \tag{73}$$

This solution is obtained by the variable separation method. Now, preparing a function $A(\tau)$ of only $\tau$ and a function $B(x)$ of only $x$, and put $$V_0(\tau, x) = A(\tau)B(x) \tag{74}$$

Substituting it for $V_0(\tau, x)$ in Eq. (73);

$$dA(\tau)/d\tau/A^2 = -\tfrac{1}{2}L^{-1}\Gamma^2 E^2 B'^2/B^2 \tag{75}$$

is obtained. Since both the members are functions of variables independent from each other, both the members should be constant. Denoting a constant by C, for the sake of convenience, both the members are put to $\tfrac{1}{2}L^{-1}\Gamma^2 C$. In this way, for the different functions two differential equations;

$$dA(\tau)d\tau = -\tfrac{1}{2}L^{-1}\Gamma^2 C$$

$$B'^2 = CB^2/E^2 \tag{76}$$

are obtained. The solutions for these equations are obtained as follows;

$$A(\tau) = 1/\{1/Am + \tfrac{1}{2}L^{-1}\Gamma^2 C\tau\}$$

$$B(x) = C/4\{\int 1/E\,dx + C_1\}^2 \tag{77}$$

where Am and $C_1$ are integration constants, which are determined from the continuation condition of the solutions (72) and (77) in the internal and the external region, respectively, which will be stated later.

(3) Continuation condition of solutions

In order to connect the solution (72) in the inner region with the solution (77) in the outer region and to obtain a homogeneous solution over the whole regions, it is sufficient that the values of function and the values of spatial differentiation of the solutions in the different regions are put equal to each other at the boundary $xb \equiv \alpha^* + O(\sqrt{\Gamma})$. That is, $$V_i(\tau, xb) = V_0(\tau, xb)$$

$$\partial V_i(\tau, xb)/\partial x = \partial V_0(\tau, xb)/\partial x \tag{78}$$

At first, Am is determined. Since Eq. (72) describes the state in the neighborhood of a maximum of P, it is a formula, which is valid originally in a region, where $\tau$ is small. However, in order to connect it with the solution in the outer region, enlarging the region and obtaining the asymptotic form of the solution in the region, where $\tau$ is great, $V_i(\tau, xb) \sim \Gamma/2\{-1+2\tau\}$ is obtained. In the same way, the asymptotic form of the solution in the region, where $\tau$ is small, is given by $V_0(\tau, xb) \sim -Am\{-1 + \tfrac{1}{2}L^{-1}\Gamma^2 C Am\tau\}B(xb)$. Therefore, comparing the two members with each other, it is determined that $Am = 4L\Gamma^{-2}C^{-1}$. Consequently $$A(\tau) = 4L\Gamma^{-2}C^{-1}/\{1+2\tau\} \sim 2L\Gamma^{-2}C^{-1}/\tau \tag{79}$$

is determined, where using the fact that $\tau$ is great, 1 is omitted. Using Eqs. (72) and (77), rearranging Eq. (78);

$$\Gamma\tau\exp(-\Gamma/2\tau) = A(\tau)C/4 \cdot \{\int^{xb} 1/E\,dx + c_1\}^2$$

$$-\Gamma\tau\exp(-\Gamma/2\tau) = A(\tau)C/2 \cdot \{\int^{xb} 1/E\,dx + C_1\}/E'(xb) \tag{80}$$

are obtained. When these equations are solved, the constant $C_1$ and the point of time $\tau$ at the connection are determined at the same time, as follows;

$$C_1 = -2\tau/E'(xb) - \int^{xb} 1/E\,dx$$

$$1/\tau = -2 + 4L\Gamma^{-3}\exp(\Gamma/2\tau)/\{E'(xb)\} \tag{81}$$

Using these values for the solution in the outer region, finally $$V_0(\tau, x) = L\,\Gamma^{-2}/2\tau \cdot \left\{\int_{xb}^{x} 1/E\,dx - 2\tau/E'(xb)\right\}^2 \tag{82}$$

is obtained, where since the quantity, which is to be obtained, is a differential of V with respect to x, the last term in the above equation $2\tau/E'(xb)$ can be omitted. Thus, the following equation;

$$V_0(\tau, x) = L\Gamma^{-2}/2\tau \cdot \{\int 1/E\,dx\}^2 \tag{83}$$

is obtained.

From Eq. (68-2), H'*, which is to be obtained, is given by;

$$H_i'^* = -L^{-1}\Gamma\{E(x)\}^2(x-\alpha^*)\exp\{-(x-\alpha^*)^2/2\Gamma\tau\}$$

$$H_0'^* = (\Gamma\tau)^{-1}E(x)\int 1/E\,dx \tag{84}$$

Taking the easiness of utilization into account, it is more convenient, if the temperature Topt, at which $H' = (E/T)' \equiv E'/Topt$, is defined. This is because, variations in H need not be calculated directly, but it is sufficient to calculate only variations in the cost E. When the above formula is rewritten by using this temperature the following equations are obtained for the different regions;

$$T_{iopt} = -L\Gamma^{-1}\{(x-\alpha^*)E(x)\}\cdot\exp\{(x-\alpha^*)^2/2\Gamma\tau\}$$

$$T_{oopt} = \Gamma\tau/\{\int 1/E\,dx\} \tag{85}$$

From the point of view of the order of magnitude, the last equations are written as Tiopt=O(Γ), Toopt=O(Γ), paying attention to E'=O($\sqrt{\Gamma}$) in the inner region, which is not contradictory to the definition of the temperature. It is thought that for exceeding the maximum value in the outer region the temperature is raised and the magnitude of the additive noise is increased to effect the regulation. Here a restricting condition for the temperature, which is Topt>0, is supposed. Since E(x)~(x−α*)$^2$ in the neighborhood of α*, the first equation in Eq. (85) is always negative. Therefore Tiopt=0 in the inner region. This requirement means that fluctuations at extreme values are reduced and in particular that fluctuations are eliminated in the state where the minimum value is given. Further, also in the time dependence, τ=0 in that state. Consequently, putting the two regions together, it is possible to write as follows;

$$Topt = \Gamma\tau\textcircled{H}[1/\{\int 1/E' dx\}] \quad (86)$$

where the function $\textcircled{H}$ introduced here is a function, which is equal to the value of the argument, if it is positive, and 0, if the argument is negative. Here, since $t_1$ is unknown, $\tau = t_1 - t$ cannot be directly calculated. However, if it is utilized positively that Γ is small, since variations in Γ$_\tau$ are small, it can be thought that Topt works efficiently in an approximate manner, even if this quantity is treated as a constant.

Hereinbelow a concrete embodiment will be explained.

Here, taking a simple one-dimensional cost function as an example, the usefulness of the here proposed new schedule Topt is verified. Denoting a positive constant by k, as the differential E' of the cost function;

$$E'(x) = k \prod_i (x - a_i) \quad (87)$$

is considered. In order to execute the integration of Eq. (86), the inverse of E' is rewritten as follows, $$1/E'(x) = k\sum_i \gamma_i/(x - a_i) \quad (88)$$

Then the integration can be executed easily to obtain Topt as follows;

$$Topt = \Gamma\tau k\ominus\left[1/\left\{\log\prod_i |x - a_i|^{\gamma_i} + q\right\}\right] \quad (89)$$

where $q = -\log|x\ b - a_i|^{\gamma_i}$
This equation includes still an undetermined constant q, which is treated as a parameter. In a real calculation a satisfactory result could be obtained even with q=0. Further it was supposed that Γτ=1.0

As an example of the cost function stated above, $$E(x) = \beta\{-(\rho x)^2 - \tfrac{1}{3}\cdot(\rho x)^3 + \tfrac{1}{4}\cdot(\rho x)^4\} \quad (90)$$

is considered. This equation has two minimum values at $a_1 = 2/\rho$ and $a_2 = -1/\rho_1$, in which $a_1$ gives the smallest value. The cost barrier, which is to be overcome, is $5\beta/12$. The parameters necessary for the calculation of topt are $\gamma_1 = -\rho^2/2$, $\gamma_2 = \rho^2/6$, $\gamma_3 = \rho^2/3$.

FIG. 12 indicates the comparison of T(t)=T$_0$/log(t+1); T$_0$=3 obtained by the conventional method with the result of a simulation effected with Topt. At first, contrarily to the conventional method, almost no fluctuations take place at the smallest value. Further the convergence to the smallest value is rapid (a)~(d). In extreme examples (e) and (f), even in the case where the smallest value is not achieved by the prior art method, by the method according to the present invention, it is possible to achieve it. This result indicates the average value obtained by executing 100 simulations.

Figure 10:
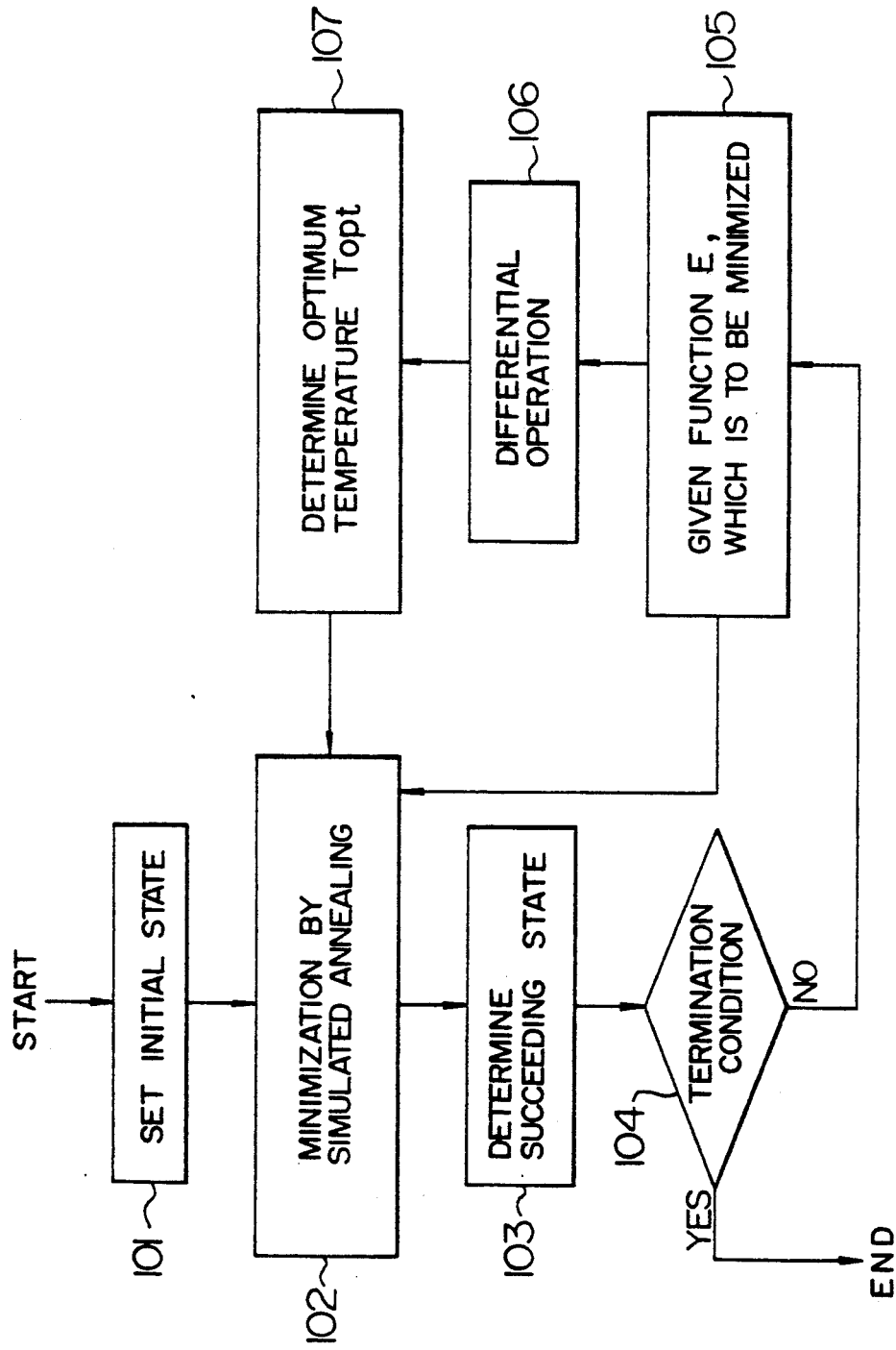
FIG. 10 is a scheme showing the conception of the whole algorism of a minimum and maximum searching device, which is another embodiment of the present invention.

The present method is applied to a still more complicated example. In this case, since the integral of Eq. (86) cannot be obtained directly, an approximate optimum schedule, as indicated below, is used. An important feature, which can be seen from the schedule indicated in the example stated above, is that it takes a great value at positions close to the cost barrier to be overcome and 0 in the neighborhood of extreme values. From this fact, it can be thought that if the cost function is set so as to have the greatest value, when the second differential $\nabla^2 E$ thereof is negative, the essence of the optimum schedule can be caught. Therefore an approximative schedule expressed by;

$$Topt = \Phi[\nabla^2 E(x)] \quad (91)$$

is proposed, where Φ is a sufficiently great positive constant $\Phi_m$, when the argument is positive, and 0, when it is negative. That is, only when the second differential is negative, the temperature is raised to increase the additive noise so that the maximum value is easily cleared. FIG. 10 indicates a conceptual scheme of the whole algorithm for the simulated annealing in this case. At first, the initial state is set (block 101) and the succeeding state (block 103) is determined by the simulated annealing (block 102). In the case where the termination condition (block 104) is NO, these processes are repeated. The optimum temperature for the annealing (block 107) is determined, starting from the differential equation (91) of a given function (block 105). In order to confirm the validity of this approximate schedule, it is applied to the following problem. It is supposed that variables X$_i$ (where i= 1, 2, ..., N (N=100×100) and i is defined at points on a two-dimensional plane mesh) take two values of ±1 and that $$E(\{X\}) = \sum_i\left(-\sum_j X_i X_j + hX_i\right) \quad (92)$$

is given as the cost function, which is to be minimized, where the first Σ represents the summation over all the variables and the second Σ the summation over variables adjacent to the i-th variable on the plane. Here h is a positive constant and here it is set at 0.1. Further it is supposed that the initial state of X$_i$ is given at random. The difficulty of this problem consists in that there exist a number of minimum values due to the fact that the variables X$_i$ take only two values. Although the minimization is possible even with the two-valued variables as they are, here the simulation is effected by transforming the two values into a continuous value according to the formulation by Hopfield and Tank, "Biological Cybernetics" Vol. 52, p. 142, (1985), by which a low cost can be realized. For this purpose the initial variables $X_i$ are transformed by using;

$$X_i = \tan h \ (F_i/B) \tag{93}$$

It is clear that $F_i$ are continuous quantities varying from $-\infty$ to $+\infty$ and that $F_i = \pm \infty$ correspond to $X_i = \pm 1$. Here, in order to improve the convergence, the constant B is set at 0.01.

For the comparison the minimum values of the function defined by Eq. (92) were obtained by using 3 different kinds of schedules indicated below.

(A) $T(t) = T_0/\log(t+1)$ (B) $T(t) = \text{constant}$ (C) $T_{opt} = \phi[\nabla^2 E], \ \phi_m = 5$ \hfill (94)

Figure 13:
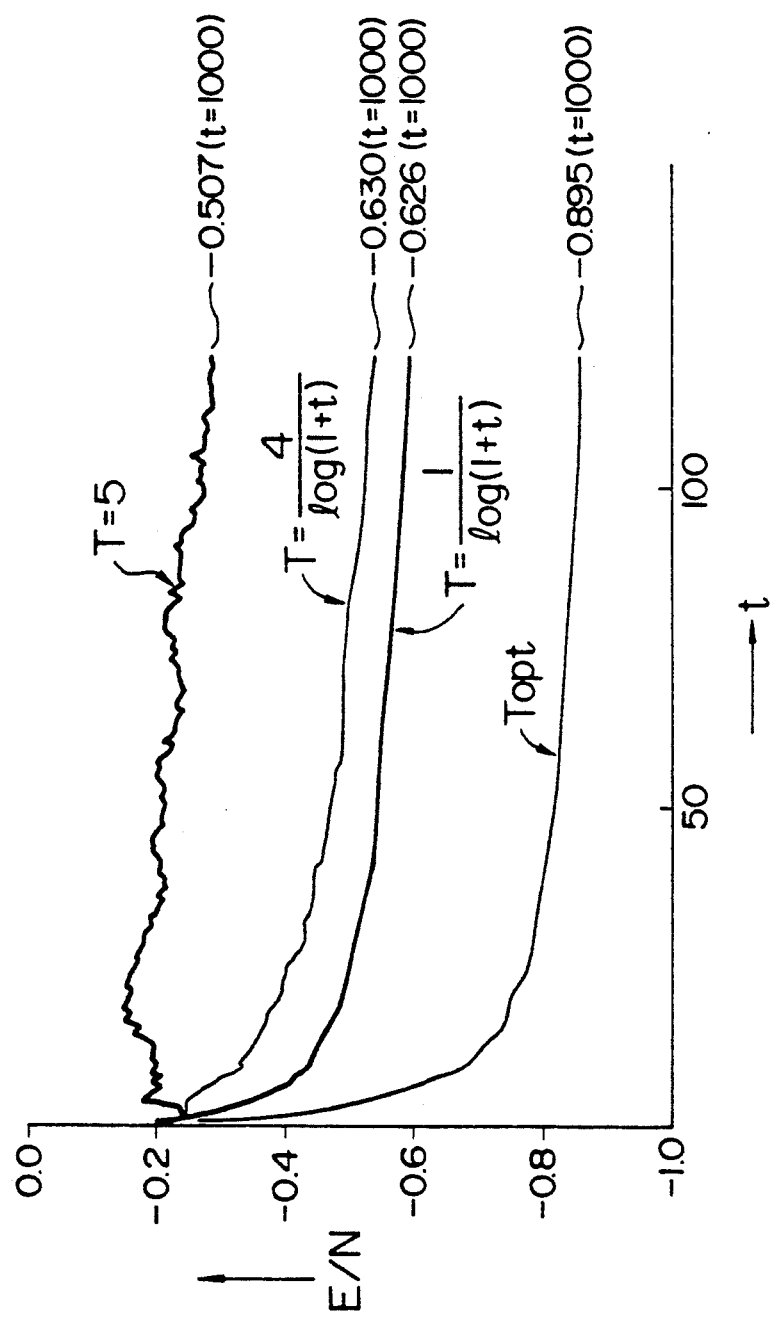

The number of Monte Carlo simulations is represented by a notation t. The greatest value $t_{max}$ of t was 1000. Further, for the comparison, the smallest value of $T_{opt}$ was not 0, but it was set at $1/\log(t_{max}+1)$, which was the value of T by (A) at $t_{max}$. FIG. 13 show simulation results. By the prior art method by (A) the simulation was effected for $T_0 = 1.0$ and 4.0. Although they shows somewhat different values at the starting point of time, both of them give an almost same value $$\frac{E}{N} = -0.63$$

as the cost at $t_{max}$. However, by (C), it was possible to obtain a cost $-0.90$, which is fairly lower than those obtained by other methods. However, although it thought that the low cost was obtained by the method of (C) simply by raising the temperature, the situation is totally different. In order to see it, the simulation was effected by (B) at a high temperature $T(t) = 5.0$. A result, which was worse than that obtained by the prior art method, was obtained because of significant noise.

Figure 11:
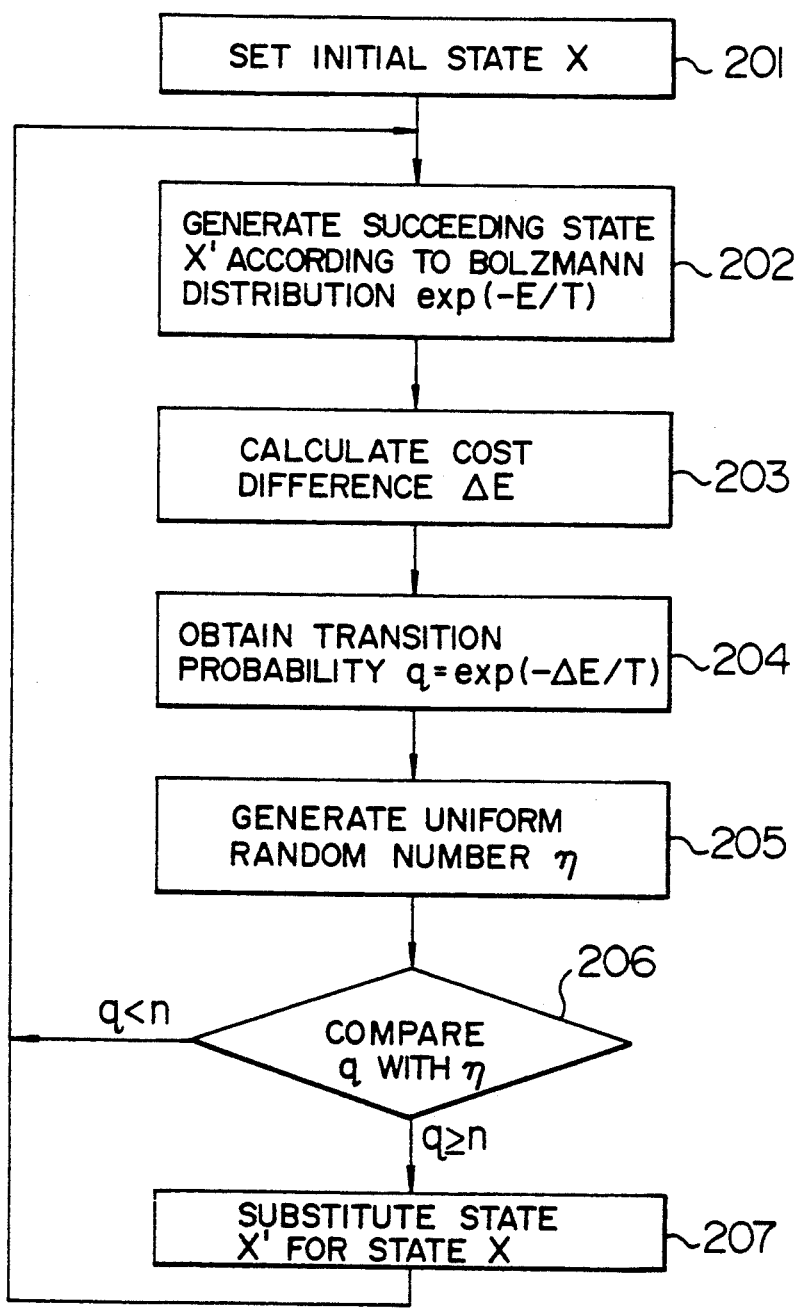
FIG. 11 is a scheme showing a calculation method of the simulated annealing.
Figure 12A:
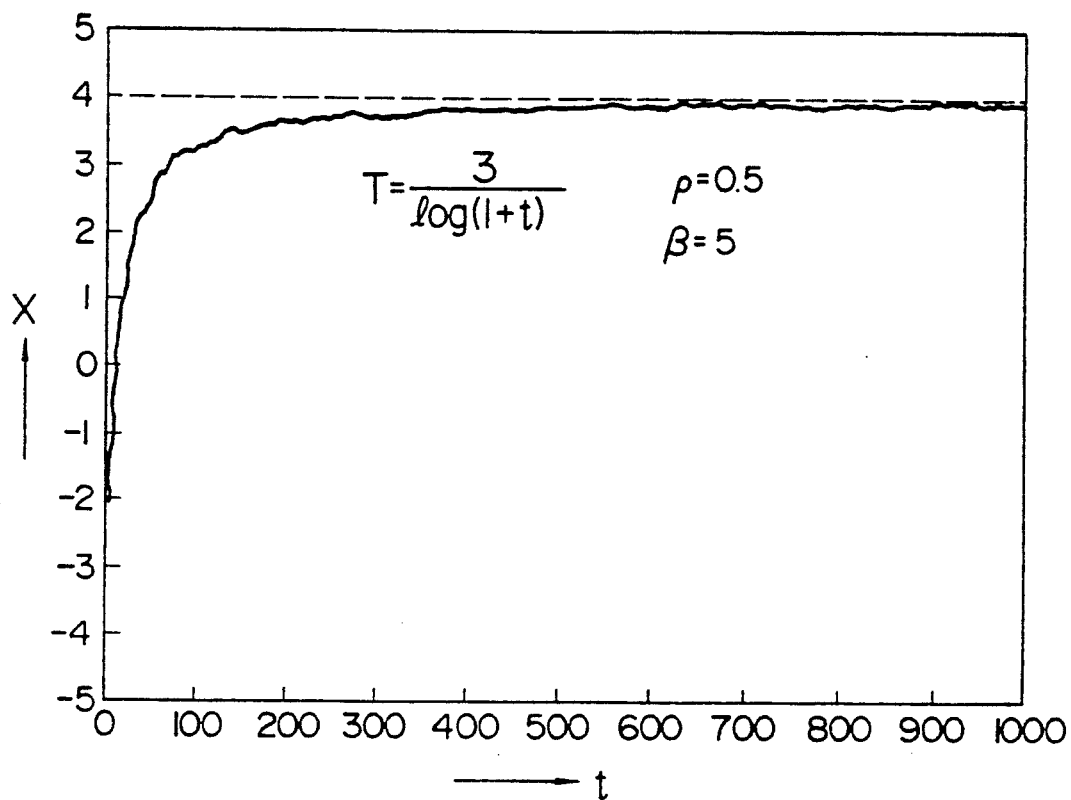
FIGS. 12a-12f and 13 are schemes illustrating examples of application of the present invention.
Figure 12B:
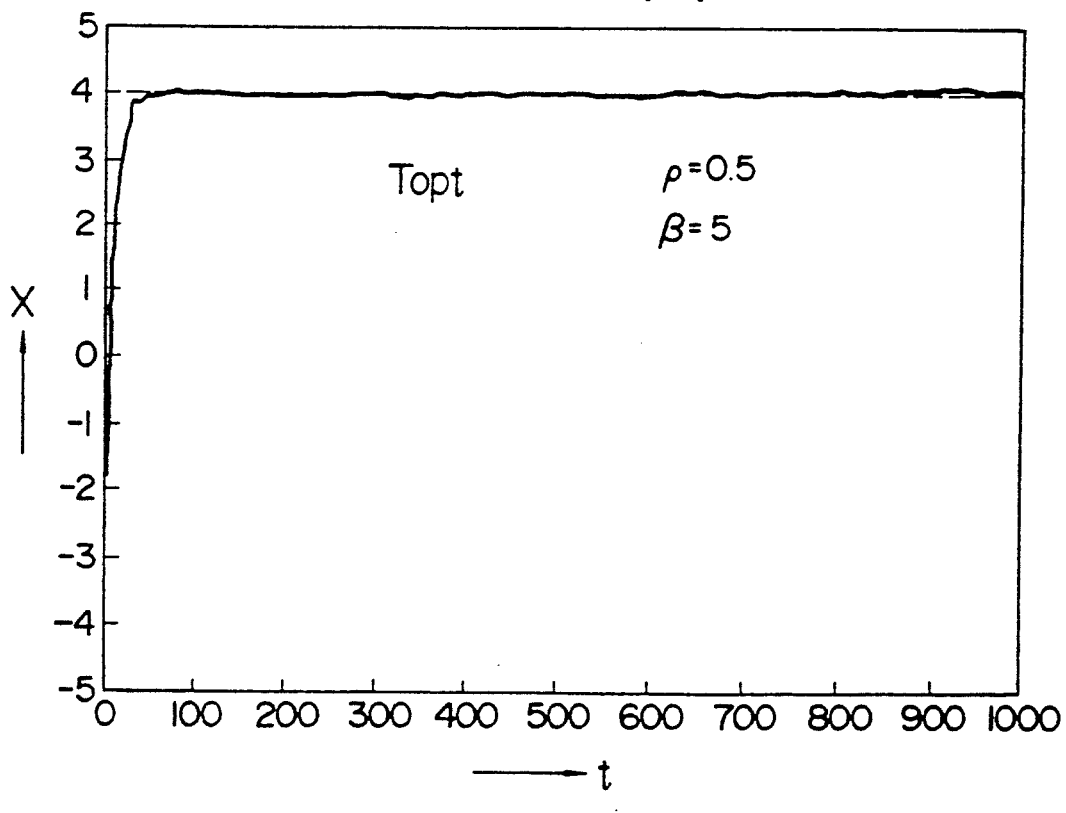
Figure 12C:
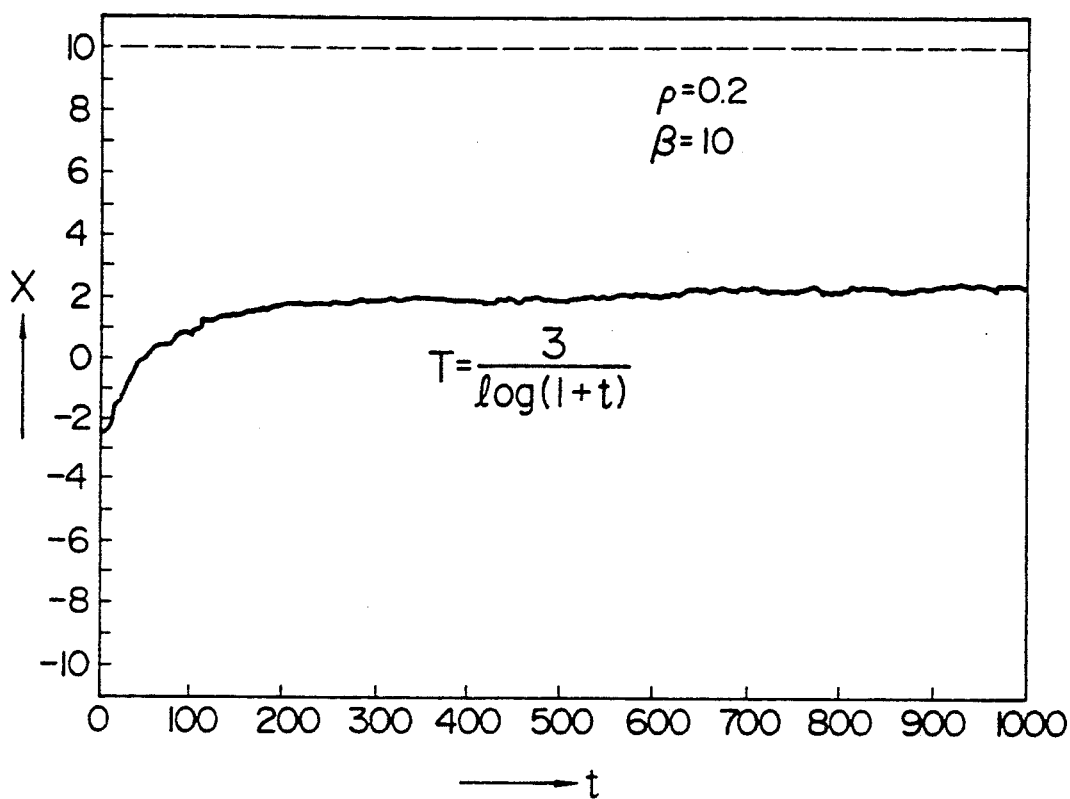
Figure 12D:
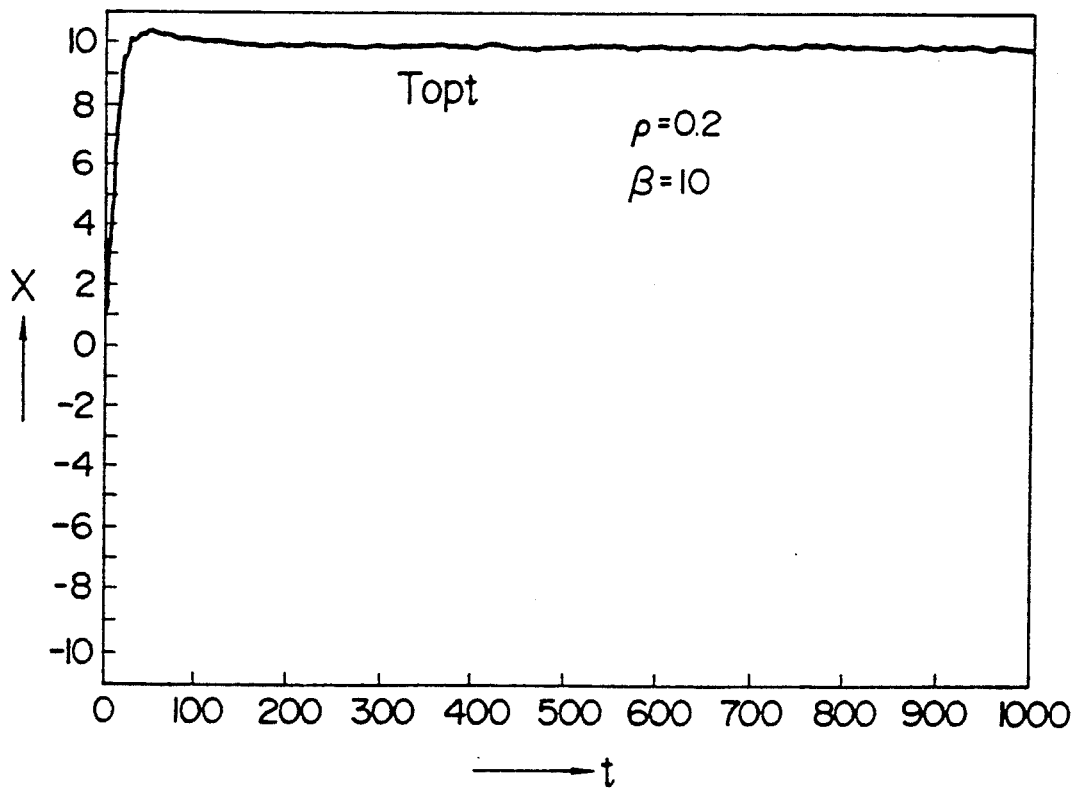
Figure 12E:
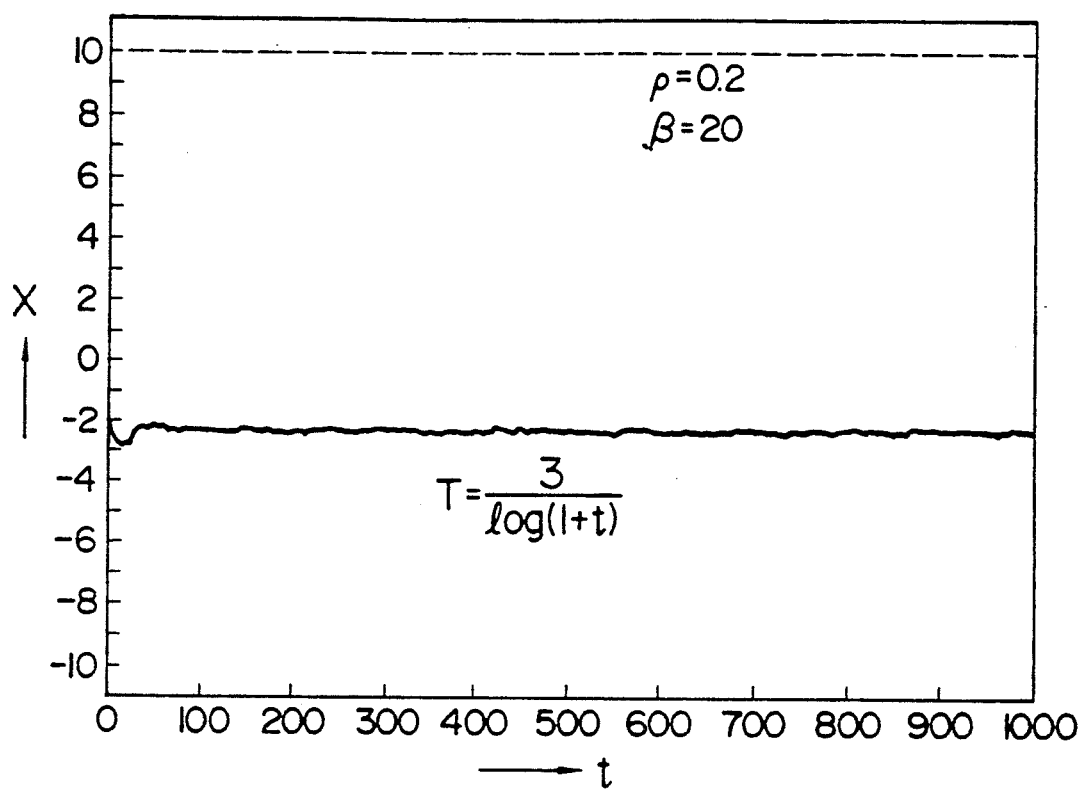
Figure 12F:
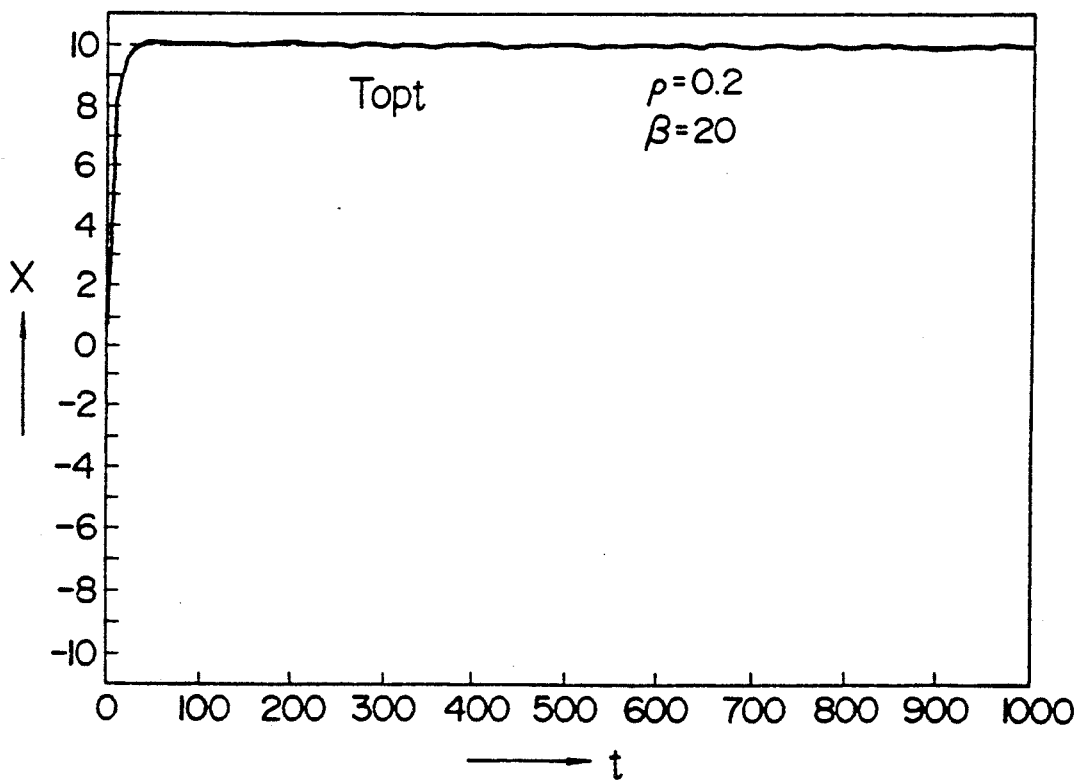
Figure 14:
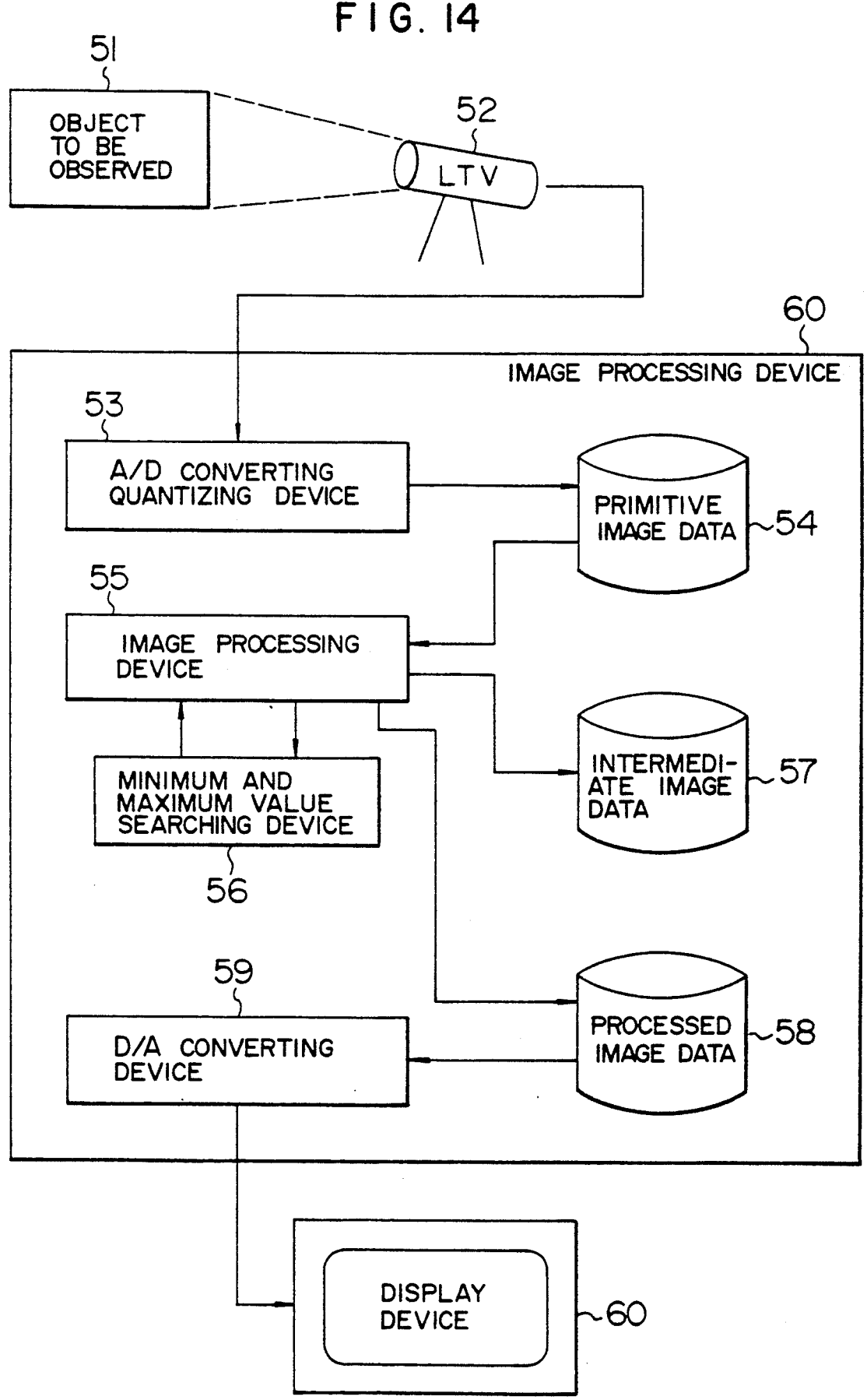
FIG. 14 is a scheme of animage processing system, in the case where the present invention is used for an image processing.

FIG. 14 indicates schematically the outline of an image processing system utilizing the present invention. Electric signals obtained by imaging an object to be observed 51 by means of an ITV camera are sent to an image processing device 60 having at least a processor and a memory. They are transformed into digital image data by an analogue-digital converting and quantizing device 53 and stored in a file 54 as primitive image data. Noises due to various factors are mixed in these primitive image data apart from errors caused by non-linear characteristics of the ITV camera 52. Then the primitive image data are read out from the file 54 and sent e.g. to a probabilistic image processing device 55. In this processing processings such as removal of noises without dulling edges are achieved, in general, by minimizing the energy of the image constructed by the primitive image data. This minimization is executed by a minimum and maximum value searching device 56 according to the present invention. The processing is effected by the repetition method according to FIGS. 10 and 11 and the intermediate result is stored in a file 57.

The processed image data are read out at need after having been stored in a file 58 and subjected to other image processings or displayed on an display device 60 after having been sent to a D/A converting device 59.

INDUSTRIAL APPLICABILITY

According to the present invention the following effects can be obtained.

(1) The calculation speed for problems of recognizing images, sound, etc., movement control, time dependent large scale numerical calculations, which were difficult to solve by means of a prior art computer, can be increased by taking-in internal structure based on living body physiological knowledge or presumed from that knowledge and by means of a neural network, whose basic principle is the parallel concurrent and competitive action of groups of neural elements.

(2) A probabilistic mountain climbing method called simulated annealing is proposed, by which, in the case where minimum (maximum) values of a function having a number of extreme values, the maximization of $\exp[-E/T]$ is considered instead of a function E. The parameter introduced here is called temperature and introduced in order to make it possible to generate random noise and to allow probabilistic treatment. Consequently, when E reaches the smallest value, it is necessary to set T at 0 to make the value stay at the smallest value without errors. It is the greatest problem of the simulated annealing to determine how to decrease T to a low temperature. For this purpose the temperature was determined so that the time necessary for passing from the initial state to the state, where the greatest value, which is the final target, is given, was minimized. As the result of a simulation experiment, it was possible to verify that the smallest value, which is smaller than that obtained by the prior art method, can be obtained even for a complicated non-linear function having a number of independent variables. In this way it is possible to obtain surely the smallest value with a high speed.

We claim:

1. A high order information processing method, as performed by a neural network, comprising the steps of:
    performing at least one or a combination of a plurality of various information processings including a feature extracting processing, a feature unifying processing, a memory processing, a recognizing processing, and a control information generating processing by arranging an internal structure of said neural network based on physiological knowledge information of a living body;
    arranging said internal structure of said neural network according to an intended information processing based on said physiological knowledge information; and
    effecting parallel concurrent and competitive actions of a group of neural elements constituting said neural network internally arranged by said arranging step.

2. A high order information processing method, as performed by a neural network, according to claim 1, wherein when said feature extracting processing is performed said method further comprises the steps of:
    causing a number of neural elements in said neural network to be arranged in a layered structure having a plurality of layers; and
    eliminating noises, which are unnecessary for feature propagation, by making a value proportional to an average value of a state of a group of neural elements in each of the layers propagate to a group of neural elements located in a next higher layer at the same time features are extracted hierarchically one after another.

3. A high order information processing method, as performed by a neural network, according to claim 2, wherein said value proportional to the average value is used to extract the features hierarchically one after another; and wherein said method further comprises the steps of:

defining a probability distribution for general synapse couplings between the neural elements having a linearity or a non-linearity in each of the layers;

executing an operation by integrating a high frequency component of the probability distribution; and keeping probability of coupling between adjacent neural elements invariant.

4. A high order information processing method, as performed by a neural network, according to claim 1, wherein when said feature unifying processing is performed said method comprises the steps of:

matching inputted features with high order information or concept information through concurrent and competitive actions;

arranging neural layers constituted by groups of neural elements corresponding to features extracted by feature extracting processing in lower layers;

arranging a group of middle layers having groups of neural elements corresponding to information combining for the features extracted; and arranging neural elements corresponding to a feature to be recognized or a concept thereof from combined features in the uppermost neural layer;

wherein depending on a degree of relation between neural elements within each layer or between different layers, a large positive value is assigned to a synapse coupling between the neural elements, if the relation is strong, and a negative value is assigned thereto, if there is no relation.

5. A high order information processing method, as performed by a neural network, according to claim 4, wherein said feature unifying processing comprises the steps of:

processing, including solving a problem of minimizing energy consisting of a product of a synapse coupling between neural elements and a second order term of the state of said neural elements and a product of a threshold value and the state of said neural elements, the neural elements having a function that if all information inputted in one of said neural elements is greater than a second threshold value, the one neural element is ignited and if the information is smaller, then the one element is placed in pause state.

6. A high order information processing method, as performed by a neural network, according to claim 5, wherein said processing of solving said problem of minimizing energy includes the step of:

processing, by a hypothetical neural network, in which synapse coupling between neural elements is constant and the threshold value depends on a square root of an original synapse coupling, of introducing a new variable taking a continuous value and deducing a new energy consisting of a second order term of the new variable and a product of the new variable, a square root of the synapse coupling and an original state of the neural elements.

7. A high order information processing method, as performed by a neural network, according to claim 1, wherein when said memory processing is performed said method comprises the steps of:

processing, by which high order processing is stored for a long term by coding it as a value of a synapse coupling between neural elements, by memorizing the high order processing necessary for feature unifying processing by learning;

arranging neural elements corresponding to high order information in an input layer, the neural elements arranged in a number of intermediate layers for transmitting information through the synapse coupling; and modifying the synapse coupling, depending on the difference between output information from an output layer and target information.

8. A high order information processing method, as performed by a neural network, according to claim 7, wherein said memory processing is executed to thereby provide memory functions having different mechanisms corresponding to a long term memory and a short term memory in accordance with physiological knowledge information.

9. A high order information processing method, as performed by a neural network, according to claim 8, wherein said long term memory is based on a synapse coupling structure which is based on said physiological knowledge information including statistical experimental physiological facts which includes information indicating dependence of a diameter of a tree-shaped protrusion on a distance of a position of attachment of the protrusion from a center of a cell body and information indicating dependence of a number of synapses attached to the tree-shaped protrusion on the diameter of the tree-shaped protrusion at the position of the attachment.

10. A high order information processing method, as performed by a neural network, according to claim 9, wherein said structure of synapse coupling is so determined that an amount of information, which can be transmitted by the coupling between a predetermined neural element and the closest adjacent neural element decreases successively through each succeeding neural element, in such a manner that a coupling between the predetermined neural element and a second adjacent element, after the closest adjacent neural element, transmits $\frac{1}{2}$ of the amount of the information transmitted between the predetermined neural element and the closest adjacent neural element, and a coupling between said predetermined neural element and a third adjacent element, after the closest adjacent neural element transmits $\frac{1}{4}$ of the amount of the information transmitted between the predetermined neural element and the closest adjacent neural element, on the basis of an optimization principle, by which a sum of energy consumption necessary for transmitting information through axons serving as information transmitting medium and a space occupied by the axons is minimized.

11. A high order information processing, as performed by a neural network, according to claim 8, wherein in order to determine suitable values for the synapse, said long term memory processing is executed by forming the synapse coupling between the input layer of the neural network and the next upper layer by a product of the input information and a random L variable, forming the synapse coupling between the output layer and the next lower layer by a product of the output information and a random variable, and forming the synapse coupling between the other layers by a product of two kinds of independent random variables, or means for generating the synapse couplings from two kinds of random variables and determining said random variables for a synapse coupling of the lower layer one after another, starting from a synapse coupled with the output layer, so that the difference between output information and target information is decreases.

12. A high order information processing method, as performed by a neural network, according to claim 8, wherein said short term memory processing is executed by making the memory correspond to minimum values of energy for the neural network or stationary states of dynamic equations deduced from said energy.

13. A high order information processing method, as performed by a neural network, according to claim 12, wherein said short term memory processing includes a processing for identifying physiological knowledge information that make stationary states of said dynamic equation appear by setting random values for all synapse couplings and make it possible to increase a number of stationary states to a certain finite number by increasing a number of synapse couplings coupled with neural elements, a state being chaotic, where no stable states can be realized, even if the number of couplings is increased, exceeding said finite number.

14. A high order information processing method, as performed by a neural network, according to claim 1, wherein said recognizing processing comprises the steps of:
processing, by which primitive features such as figures consisting of lines or edges of an image are extracted hierarchically by said feature extracting processing;
unifying said primitive features to obtain information of high order in a degree necessary for recognition in said feature unifying processing; and
matching said information obtained by said unifying step with high order information stored by previous learning in said memory processing.

15. A high order information processing method, as performed by a neural network, according to claim 5, wherein said step of processing includes the steps of:
processing an initial visual sensation such as movement direction recognition, depth recognition; and
processing to minimize a sum of energy based on a system of equations deduced spontaneously from a fact that a brightness of an image is kept unchanged with respect to movement and energy based on apriori limiting conditions for determining a solution.

16. A high order information processing method, as performed by a neural network, according to claim 1, wherein in a movement control such as the control of a robot manipulator by means of said neural network, in order to control an object following a dynamic equation structurally determined so that the trajectory thereof follows a target trajectory, at first a neural network for identifying the behavior of the object is newly constructed and the object is controlled by the neural network at a point of time, where the output of is equal to the output of the object.

17. A high order information processing method, as performed by a neural network, according to claim 4, wherein said processing steps comprise the steps of:
processing, by which a negative solution method is used for time finite differences, for which stability of a solution of non-stationary partial differential equations is secured;
effecting for a space a finite differentiation by using the finite difference-finite element method;
assigning finite-differentiated variables to neural elements constituting the neural network; and
executing minimization of energy deduced from equations by a network multiply layered, corresponding to the time finite difference.

* * * * *